(12) United States Patent
Lepola et al.

(10) Patent No.: US 7,523,764 B2
(45) Date of Patent: *Apr. 28, 2009

(54) METHOD AND APPARATUS FOR SPOT REPAIR OF PIPE

(75) Inventors: William Lepola, Magnolia, TX (US); John Perry Nixon, Katy, TX (US)

(73) Assignee: Energy Maintenance Services Group I, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,170

(22) Filed: Dec. 20, 2005

(65) Prior Publication Data

US 2006/0130923 A1    Jun. 22, 2006

Related U.S. Application Data

(60) Provisional application No. 60/637,524, filed on Dec. 20, 2004.

(51) Int. Cl.
*F16L 55/16* (2006.01)
(52) U.S. Cl. .......... 138/98; 138/97; 405/150.1; 405/184.2; 264/36.17
(58) Field of Classification Search .......... 138/97, 138/98; 264/36.17, 404; 219/243; 156/287, 156/94, 156; 405/150.1, 184.2
See application file for complete search history.

(56) References Cited

U.S. PATENT DOCUMENTS

| | | | |
|---|---|---|---|
| 1,362,351 A | 12/1920 | Rankin | |
| 3,679,534 A * | 7/1972 | Weinberg | 428/118 |
| 4,058,704 A * | 11/1977 | Shimizu | 219/528 |
| 4,191,383 A | 3/1980 | Baker et al. | |
| 4,778,553 A | 10/1988 | Wood | |
| 4,792,374 A | 12/1988 | Rianda | |
| 4,861,634 A | 8/1989 | Renaud | |
| 4,929,669 A | 5/1990 | Jensen | |
| 5,049,003 A * | 9/1991 | Barton | 405/184.1 |
| 5,071,506 A * | 12/1991 | Nelson et al. | 156/441 |
| 5,199,463 A | 4/1993 | Lippiatt | |
| 5,216,085 A | 6/1993 | Guenthner et al. | |
| 5,259,901 A | 11/1993 | Davis et al. | |
| 5,266,137 A | 11/1993 | Hollingsworth | |
| 5,606,997 A | 3/1997 | Blackmore et al. | |

(Continued)

FOREIGN PATENT DOCUMENTS

JP    2-150334    6/1990

(Continued)

*Primary Examiner*—James F Hook
(74) *Attorney, Agent, or Firm*—David McEwing

(57) ABSTRACT

The invention comprises a fluid inflatable bladder with at least one electrical heating component comprised of carbon fibers. Also subject of the invention is an interior surface pipe repair material placement, transport and installation device for in situ pipe repair comprising an cylindrically shaped electrically resistive heatable bladder having an inflatable annulus with fixed diameter cone ends wherein the cone ends and the deflated bladder are dimensioned to fit within an interior of a pipe. The tapered cone ends facilitates maneuvering of the bladder within the pipe, and a middle segment of the bladder may be inflated to expand in a radial direction to press a repair material to the interior pipe surface. The invention includes fluid conveying components connectable to the inflatable annulus; and electrical power connector components connectable to resistive heating elements of the bladder.

17 Claims, 19 Drawing Sheets

U.S. PATENT DOCUMENTS

| | | | | |
|---|---|---|---|---|
| 5,628,345 | A | * | 5/1997 | Fisco .......................... 138/98 |
| 5,706,861 | A | | 1/1998 | Wood et al. |
| 6,276,398 | B1 | * | 8/2001 | Lange ......................... 138/98 |
| 7,052,567 | B1 | * | 5/2006 | Blackmore et al. ............. 156/94 |
| 7,073,536 | B2 | * | 7/2006 | Blackmore et al. ............ 138/98 |
| 7,135,087 | B2 | * | 11/2006 | Blackmore et al. .......... 156/293 |
| 2003/0213556 | A1 | * | 11/2003 | Blackmore et al. .......... 156/294 |

FOREIGN PATENT DOCUMENTS

| JP | 2-158323 | 6/1990 |
|---|---|---|
| JP | 6-234161 | 8/1994 |

* cited by examiner

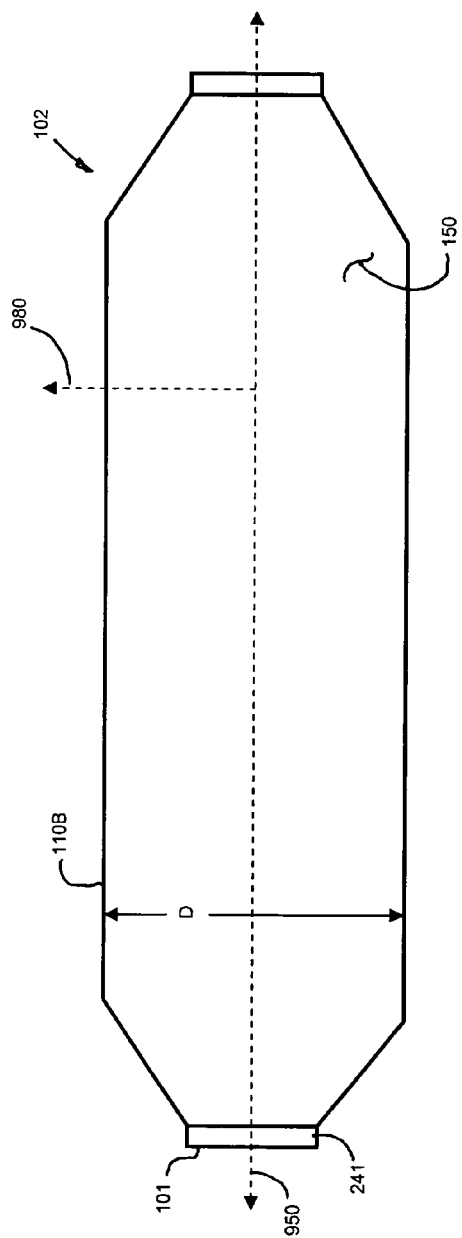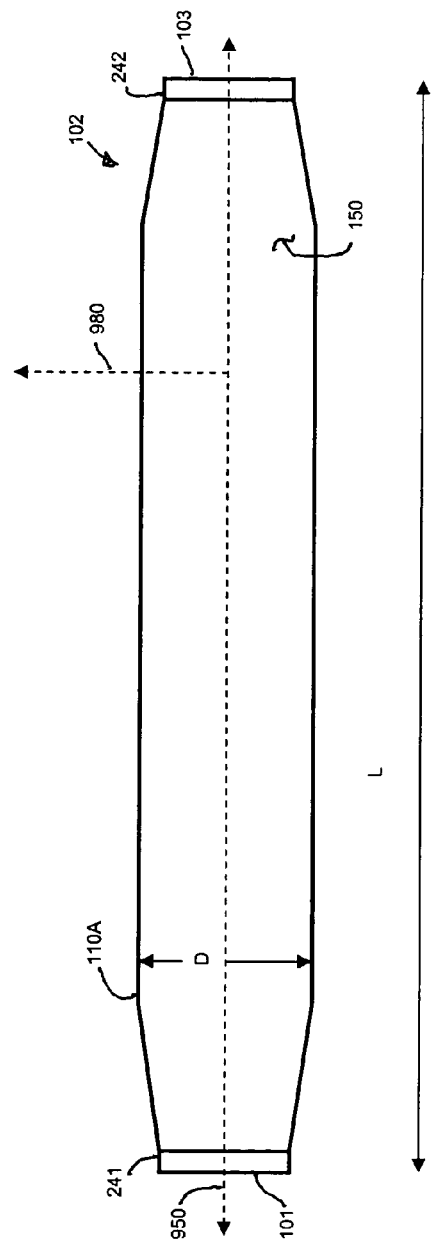
FIG. 2B
FIG. 2A

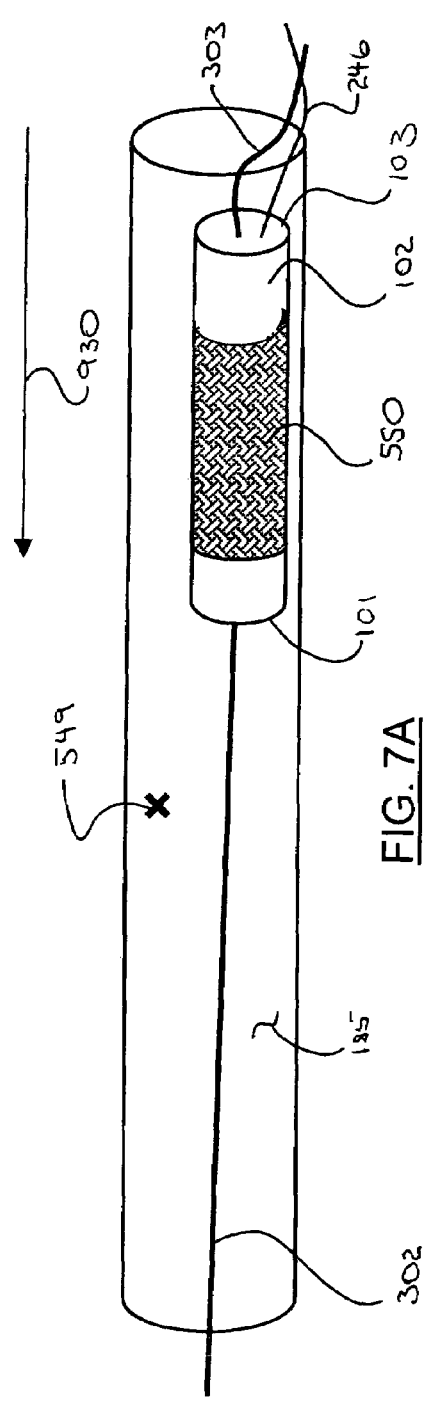
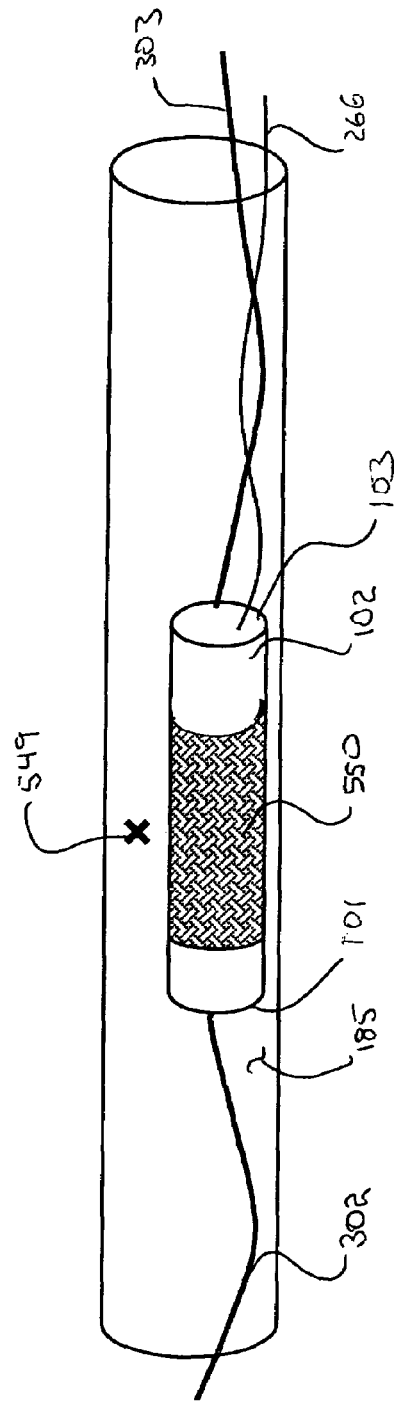
FIG. 7A
FIG. 7B

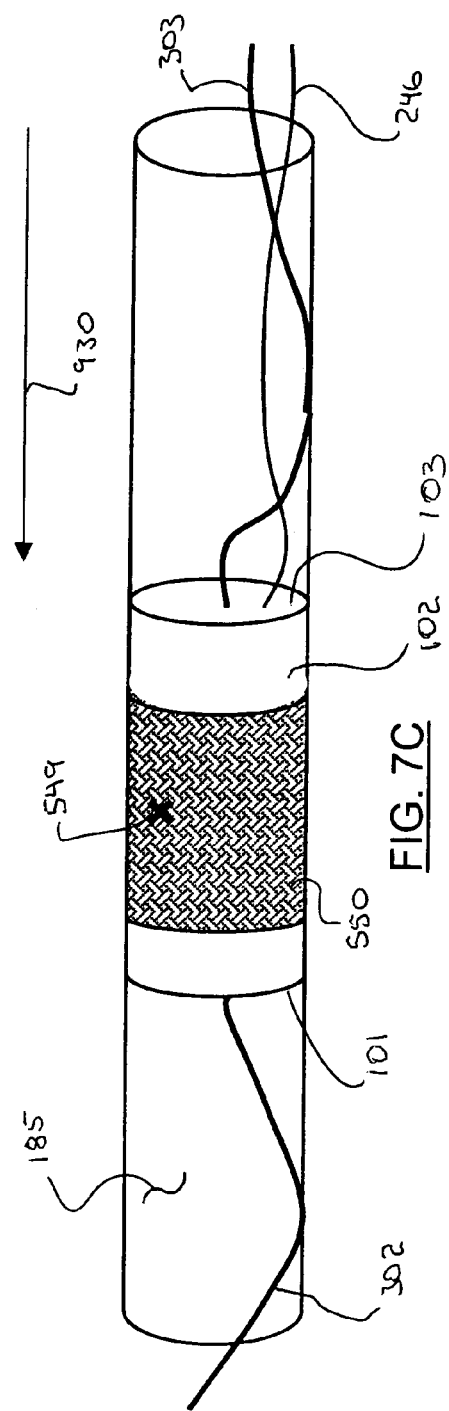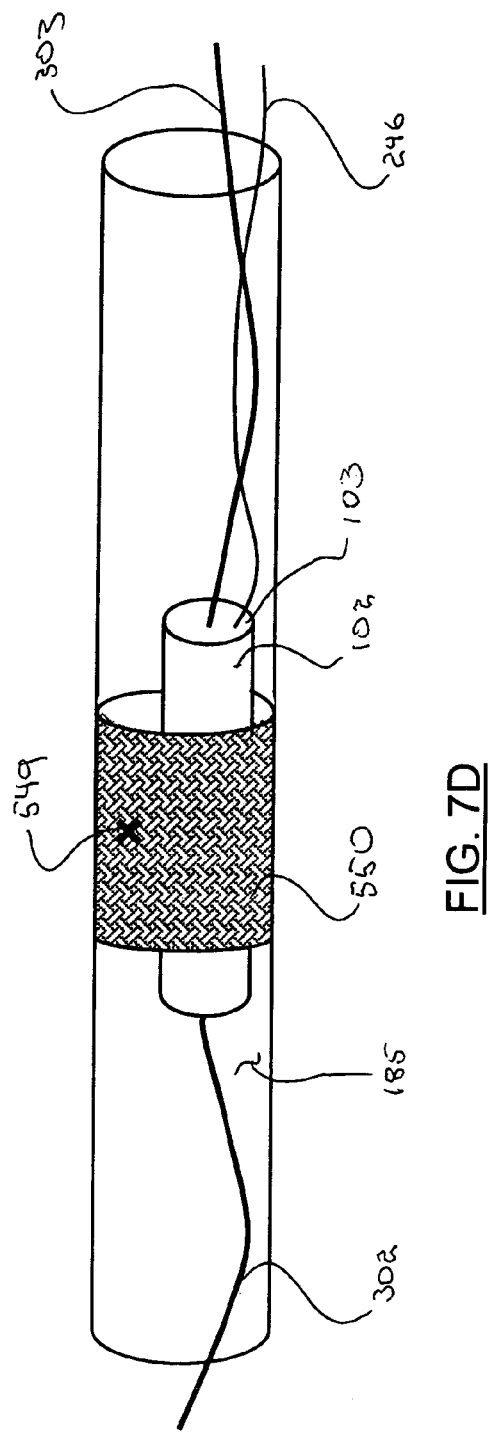
FIG. 7C
FIG. 7D

METHOD AND APPARATUS FOR SPOT REPAIR OF PIPE

RELATED APPLICATION

This application claims benefit of priority to provisional application Ser. No. 60/637,524, entitled "Method and Apparatus for Spot Repair of Pipe" filed Dec. 20, 2004.

BACKGROUND OF INVENTION

1. Field of Invention

The present invention is for an apparatus and method for the installation of a repair material within a conduit or pipe such as a sanitary sewer line. More specifically, the invention pertains to an apparatus and method for the installation of a repair material controlled from a remote location using fluid pressure and electrically resistive or impedance heating to deploy, form and cure the repair material to the inside surface of a pipe.

2. Description of Related Art

The related art pertains to underground or otherwise inaccessible pipes, pipelines, tubes or conduits and the repair, patching or relining of such structures.

BRIEF SUMMARY OF THE INVENTION

The invention comprises an in situ pipe repair device for placement, transport and installation of a pipe repair material onto the interior pipe surface. The invention comprises a fluid inflatable bladder having a cylindrical shape with a closed first end, a first inside surface and a second outside surface and a closeable second end creating an inflatable annulus, and at least one layer of an elastomer that permit the bladder to be expanded. The invention also comprises a heating component of carbon fibers or carbon hybrid fibers forming a second layer (for example knitted fibers), a conductive end component (for example a copper bus) attached to the heating component and attachable to power connector components that together, when connected to a power source, form at least one electrical circuit. The device of the invention includes a closeable fluid access port that can convey a fluid into the inflatable annulus, and cone ends that are attachable to the first bladder end and second bladder end wherein the diameter of the cone bases are at least as large as a middle segment diameter of the deflated bladder.

The invention further comprises an in situ pipe repair device for placement, transport and installation of a pipe repair material onto the interior pipe surface including an inflation component of first end piece and a second end piece, each having a fixed dimension and wherein at least one end piece has a controllable opening. Also included is a cylinder component that is fluid impermeable with an expandable diameter and having a first end and second end that are fluid sealably attachable to the first end piece and the second end piece. The combined cylinder component, first end piece and second end piece form an inflatable annulus. Also included is a cylindrical shaped heating component with an expandable diameter and also having a first end and a second end and dimensioned to fit within the cylinder component. Along with the heating component is a first and second conductive end component attachable to each end of the heating component and also installable within the inflatable annulus. There is an electrical connective components attachable to each conductive end component and extendable to an electrical conductor access. The device also includes a first and second cone attachable to the first and second end pieces of the inflation component. The cones further include at least one aperture for an electrical cable and fluid hose and the diameter of the base end of the cone is at least as large as the deflated cylinder component.

Also subject of the invention is an interior surface pipe repair material placement, transport and installation device for in situ pipe repair comprising a cylindrically shaped electrically resistive heatable bladder having an inflatable annulus with fixed diameter cone ends wherein the cone ends and the deflated bladder are dimensioned to fit within an interior of a pipe. The tapered cone ends facilitates maneuvering of the bladder within the pipe, and a middle segment of the bladder may be inflated to expand in a radial direction to press a repair material to the interior pipe surface. The invention includes fluid conveying components connectable to the inflatable annulus; and electrical power connector components connectable to resistive heating elements of the bladder.

Also disclosed is an interior surface pipe repair material placement, transport and installation method for in situ pipe repair. The method includes the steps of placing a repair material containing heat responsive resin onto an electrically heatable and fluid inflatable device having a middle segment between a first fixed diameter cone end and a second fixed diameter cone end wherein a diameter of the middle segment is less than the diameter of a base of the cone end when the bladder is deflated and greater than the diameter of the base when the bladder is inflated. An additional step is attaching a fluid conveying component to an inflatable annulus of the device. Additional steps further include attaching an electrical power component to a resistive heating component of the device; inserting the device and repair material into an interior of the pipe to be repaired; maneuvering the device within the pipe to a repair location using the cone ends to facilitate the movement of the device through the interior of the pipe. The method then includes inflating the annulus of the device sufficiently to press the repair material to the interior surface of the pipe; energizing the resistive heating component sufficiently to heat the heat responsive resin of the repair material; de-energizing the resistive heating component after the repair material has been sufficiently heated; deflating the bladder and removing the device from the pipe.

BRIEF SUMMARY OF DRAWINGS

FIG. 2A illustrates a cross sectional view of the cylindrical shaped structure along the longitudinal axis of orientation.

FIG. 2B illustrates a second cross sectional view of the bladder and the radial expansion of the bladder after inflation.

FIGS. 7A through 7E illustrate the positioning of the repair tool, being the heatable and inflatable bladder with operative communication hoses and cables, with the repair material, into the pipe, the installation of the repair material and subsequent removal of the tool.

Figure 1A:
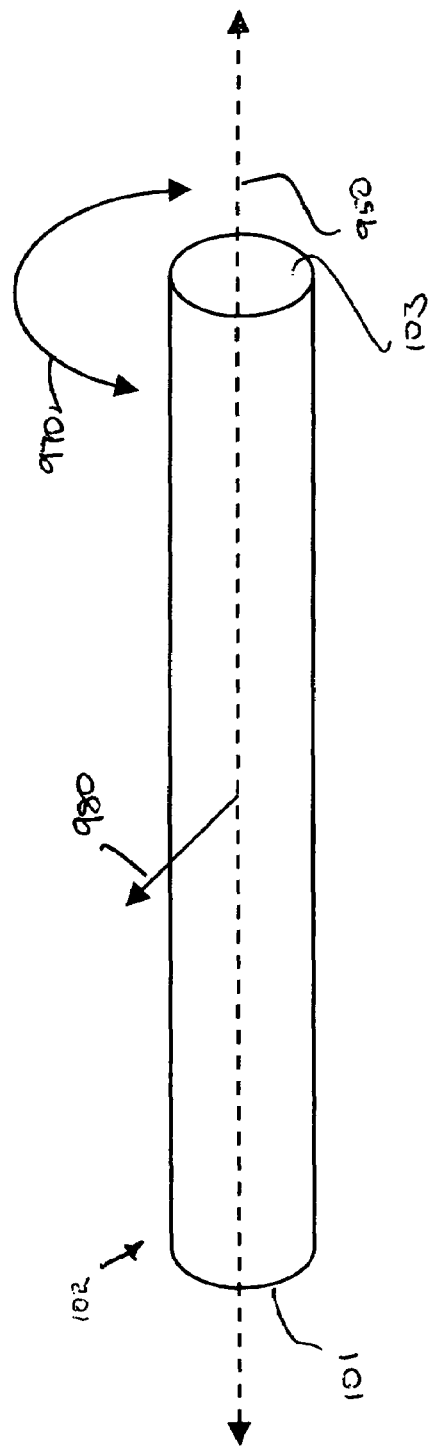
FIG. 1A illustrates a perspective view of a cylindrically shaped structure subject of the invention showing the directional vectors of orientation.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF INVENTION

While this invention is susceptible of embodiments in many different forms, there is shown in the drawings and will herein be described in detail illustrated embodiments of the invention with the understanding that the present disclosure is to be considered as an exemplification of the principles of the invention. The illustrations and the described embodiments are not intended to limit the broad aspect of the invention. The above general description and the following detailed description are merely illustrative of the subject invention. Additional modes, advantages and particulars of this invention will be readily suggested to those skilled in the art without departing from the spirit and scope of the invention.

The present invention generally relates to a device and method for installing a repair lining or patch ("repair material") within an existing pipeline or conduit (hereinafter "pipe"). This can allow a breach of the pipe wall to be sealed or otherwise repaired. The size of the repair or "patch" can be varied. Pipes of varying diameter or radius can be repaired by the invention.

The device and method of the invention teaches in situ repairing of a pipe by applying a repair material to the interior pipe wall surface utilizing an inflatable and heatable device. The device is shaped and dimensioned to fit and maneuver within the interior of the pipe when deflated and, when inflated, to expand to press and hold the repair material against the pipe wall surface.

The device comprises an inflatable bladder. The bladder contains one or more electrically conductive components. The components can comprise carbon or graphite fibers or filaments ("carbon fibers") or filaments containing carbon fibers ("carbon hybrid fibers"), that when energized with electricity can serve as heating elements ("heating component"). The electrically conductive components may also comprise conductive end components and electrical connective components. The heating component, conductive end components (also termed "bus"), and electrical connective components are placed within the inflatable component of the bladder. There may be a plurality of heating components and these heating components may be separately controllable. The heating component heats by the creation of impedance or resisitive heat (hereinafter "resistive heating").

The inflatable component may comprise a sealable bladder of one or more flexible layers (collapsible and bendable) of fluid impermeable material. These layers may be discrete and separate. The inflatable component may comprise one or more elastomers. (The fluid may be a gas or a liquid and will be used to inflate the bladder.)

The heating component may be contained between the two or more separate layers. In one embodiment, the heating component is a middle layer of material to the inflation component. The heating component(s) may be moveable within or between the separate fluid impermeable layers of the inflation component. Alternatively, the heating element may be embedded within at least one layer, e.g., contained within or affixed to the outer surface layer.

In another embodiment, the inflatable component comprises a flexible walled cylinder subcomponent with fixed dimensioned and detachable ends ("end pieces"). The inflatable cylinder subcomponent may be removeably attached to each end piece. This fluid sealable attachment may utilize mechanisms such as circular clamps. The combined end pieces and the flexible cylinder walls are fluid impermeable and form a fluid inflatable annulus. In the embodiment illustrated, the second end piece contains at least one electrical and fluid access port. The fluid access port may be connectible to a fluid hose or other subcomponent and permitting the transfer of fluid to and from the inflatable annulus.

In another embodiment, there may be a second hose and access port connected to a fluid controller. The second end piece may also contain an electrical conductor access subcomponent. This subcomponent communicates electrical power from a separate power supply through the end piece to a connective component and to the electrical end component and thereby the heating component. The electrical conductor access component facilitates the fluid sealable end of the inflation device while maintaining a means to provide electrical power to the heating component.

In another embodiment, an electrically connective component, such as a conductive wire, may be run through the end piece and the aperture closed with silicone or other similar fluid impermeable material.

The heating component may comprise carbon fibers arranged in an expandable and flexible interlaced pattern, including but not limited to fibers in a knit or braid configuration. The knit configuration may be chosen inasmuch as it permits radial and circumferential expansion of the heating component with minimal change in the longitudinal direction or length. The knit configuration may comprise a cylindrical or tubular shape dimensioned complementary to the inflation component. It will be appreciated that the heating component is intended to expand with the fluid impermeable layer(s) of the bladder when inflated.

As disclosed above, the heating component can be placed in electrically conductive communication with the separate located energy power source. This heating component may also contain a plurality of non-conductive subcomponents such as fibers employed as reinforcing members and to increase electrical resistivity. An example is the above described carbon hybrid fibers that may, for example, contain glass or polyester fibers. Both the electrically conductive and non-conductive fibers may interrelate to reinforce and limit an elastic expansion of the inflatable component.

In one embodiment, the electrically conductive heating component forms a cylindrical shape with two open ends. Circular conductive end components having fixed diameters may be attached to the heating component. The end components may be of copper or other conductive material. In another embodiment, the end component may be a copper foil attached to each end circumference of a tubular carbon fiber knit. The foil may be attached to the knit with a conductive adhesive.

The combined end components and attached heating component may be inserted into the cylindrical inflation component. The end of the heating component may be removeably attached, e.g. clamped, to the fixed dimensioned end piece. The end piece may be an aluminum cap. The cap may have circumferential indentions to facilitate a clamped holding subcomponent.

The device may also include one or more hemispherical or conically shaped end caps that protect other components and facilitate maneuvering of the device. These components ("cone ends") may be attached to each end of the bladder. It will be appreciated that each cone has a tapered end (narrow circumference) and an base end (larger circumference). The cone base end may be dimensioned to fit over the bladder end proximate to a juncture of the heating component, conductive end component, end piece, and inflation component. The interior circumference of the cone base end may be complementary to the outer diameter of the deflated bladder component that is held to a minimum diameter by the internally placed end piece. The end cone may be removeably attached to the end piece and provide a subcomponent for attachment of a tether to pull and maneuver the device within a pipe.

It will be further appreciated that when deflated, the outer circumference of the base end may be larger than the outer circumference of the inflation component. When such cone ends are placed at each end, there is formed a "middle segment" of the inflation component upon which repair material may be placed and detachably transported within the pipe interior. It will be appreciated that this middle segment is proximate to the heating component and that when the bladder is inflated, the diameter of the middle segment will be enlarged greater than the diameter of the cone end base. When deflated, the middle segment may be compressed or folded (constricted) along the longitudinal axis to further decrease its diameter. This may facilitate maneuvering the device through the pipe interior.

In the embodiment illustrated, the cones comprise an aperture for a fluid hose, electric cable and tether attachment components. The cone may be comprised of a braided and molded fiber reinforced composite. It may have sufficient pliability to facilitate maneuvering through a pipe interior. The larger diameter of the cone base end relative to the constricted middle segment containing the repair material may be advantageous. Advantages include the minimal contact between the repair material and the inner pipe surface during the transport and maneuvering of the device to the repair location. The cone shaped ends also facilitate the maneuvering of the device over irregular pipe surfaces or objects within the pipe. The hollow and collapsed inflation annulus comprised of flexible walls facilitates the device traversing pipe bends or curves.

In another embodiment, the ends of the inflation cylinder may extend past the internally installed conductive end components. This "excess" material may be pinched together to form a fluid sealable end to the inflation annulus. Electrical wires ("connector components") attached from each electrically conductive end components may pass through one or both pinched ends, thereby providing a means to energize the heating component.

The inflatable component of the bladder may serve as a removeable protective barrier for the electrical heating component while allowing the transfer of heat to the repair material carried on the outer surface of the inflatable component. The bladder structure forms a substantially hollow cavity ("inflation annulus") that can receive the inflating fluid. In the embodiments illustrated, the bladder forms a tubular shape or cylindrical shape with a longitudinal axis of orientation. The inflation component and the heating component form the outer walls of the bladder and define the axial circumference of the bladder's shape.

Inflation of the bladder permits the bladder to expand in a radial direction. In one embodiment, the inflatable component of the bladder may elastically expand. Radial expansion by inflation causes the repair material to be pressed to the interior pipe wall surface.

As described above, the access port permits the introduction of fluid into the inflation annulus. A valve component or other controllable connection can be opened to allow the evacuation of the fluid and deflation of the bladder. The inflation and deflation of the device can also be controlled by separate fluid pressure components. When deflated, the bladder returns to a smaller size, particularly with regard to its diameter. The heating component may be in communication with an electrical control unit comprising a temperature feedback controller and variable output power source.

In one embodiment, the components and subcomponents are removeably attached, thereby allowing the components to be replaced or reused. For example, if the outer layer of the inflation component is damaged, it may be replaced and the underlying heating component may be reused. Similarly, a damaged end cone may be replaced on the device.

The method of the invention also provides loading, transport and installation of a flexible repair material containing a curable or thermally responsive resin. The method further includes the procedures necessary to complete the installation of the repair materials.

In the embodiment described generally herein, the cylindrically shaped, inflatable and heatable bladder of the device has a first end and a second end. The bladder has an interior surface and an exterior surface. The interior of the bladder forms the fluid inflatable annulus.

The device can have a sub-component at one or both ends to attach an elongated tether sub-component. In one embodiment, the tether is attached to the first end of the device and used in conjunction with pulling the device to the desired location within a pipe. This tether sub-component has an attachable first end and an attachable second end. One tether end attaches to the device and the other end may be attached to a winch or other tool. The first bladder end may be closed, i.e., not containing an access port.

The second end of the bladder contains the access port that can be sealably attached to a fluid source. The port allows fluid to pass into and from the inflatable annulus and to hold the fluid within the annulus at a positive pressure to achieve inflation of the bladder.

It will be appreciated that when inflated, the outer bladder wall, having a substantially cylindrical shape and carrying a repair material, is pressed against an inner pipe wall surface. The repair material is thereby pressed between the inner pipe wall surface and the inflated outer bladder wall. The expanded bladder may impede the infiltration of substances, e.g., groundwater, through the pipe defect to be repaired. The expanded bladder can be held in this expanded pressurized position while the repair material is installed to the pipe wall. This will include the step of energizing the heating component and the resultant curing or forming of the thermally responsive resin of the repair material. The heating component is attached to conductive components, e.g., wires, and to an electrical power cable, that are also attached to an electrical power source or controller. In the described embodiment, the power cable extends from the second end of the device.

Repair material can be placed (detachably carried) on the exterior bladder surface. The repair material can be flexible fibrous material containing heat reactive or responsive resin or polymer, either thermal setting or thermal plastic (hereinafter "resin"). The resin can be applied after the material is placed on the bladder or the repair material can be pre-impregnated prior to placement onto the bladder as the beginning of the repair material installation or pipe repair process.

The heating component may be comprised of carbon fibers. The fibers can be in tows, comprised of filaments held by crimp. Alternatively, the fibers may be in a yarn containing a twist. The electrically conductive layer of the device may be made of a carbon or carbon hybrid yarn or fiber. As a hybrid, the fibers may contain a blend of the electrically conductive fibers, e.g., carbon, and non conductive fibers such as nylon, polyester, glass or Teflon. For example, the heating element may of a knit construction comprised of a hybrid yarn containing at least one filament of carbon fiber and one filament of nylon twisted together. In combinations of this type, the strength and resistivity of the layer can be enhanced. Such combination may provide enhanced strength and flexibility for repeated heat cycling and inflation of the bladder. Both the electrically conductive and non-conductive components may interrelate to reinforce and limit the expansion of the inflatable component.

The fibers can be woven tapes, wound, knitted or braided. A knitted construction may be selected as it may have more limited longitudinal dimensional change in response to radial expansion. The knit may form a tubular or cylindrical shape. The invention also includes layering or wrapping crimped fiber tows over the first inner layer of the inflatable component. The first inner layer can be non conducting or be electrically isolated from the conductive heating layer.

The conductive heating layer may also be a woven material having a circumferentially expandable seam connecting the fabric edges along the longitudinal axis of the layer. The electrically conductive layer can also be formed of a tubular braid material. This construction readily allows radial expansion in response to the fluid inflation pressure. In one embodiment, the conductive layer is a knitted fabric having the ability to be stretched circumferentially without change in the longitudinal length.

Figure 3A:
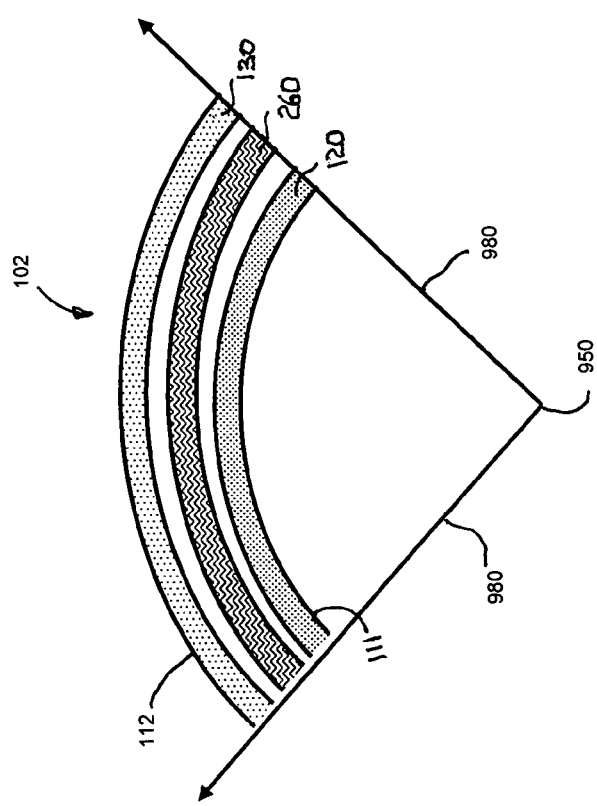
FIG. 3A illustrates the multi-layer bladder wall construction of one embodiment of the invention, showing the inner annulus, inner elastomeric and fluid impenetrable layer, the electrically conductive layer comprising the heating component, and a second outer layer having a surface that can detachably carry the repair material. In the embodiment illustrated, each layer is separate and discrete. The first and second layer comprise the inflation component.

The electrically conductive materials within the bladder may form an integral part of the bladder wall. The layers (reference FIG. 3A) can alternately be separate subcomponents, facilitating repair or replacement in the event of damage or wear. FIG. 3A illustrates the heating component interposed between two layers of the inflation component. Replaceable components will enhance the reuse of the bladder through multiple installations.

In one embodiment, at least one layer of the inflation component is an elastomeric material able to stretch and expand in response to the fluid pressure. Various polymer materials will be suitable, including but not limited to silicone, fluorosilicone or fluoropolymer. The inner surface should be substantially impermeable to the fluid used for inflation. It may have heat insulating or reflective properties. This will allow the resistive heating to be directed primarily at heating the outer repair material and interior pipe wall surface. The outer surface may have a Teflon covering to enhance the release of the repair material.

The materials of the inflation component will preferably be heat and chemical resistant. Silicone and fluoropolymer compounds may be selected as the resin material for the composite wall of the inflatable component due to their inherent anti-stick properties. These properties enable the cured prepreg pipe repair material, described below, to be easily removed from the bladder surface during the in-situ installation process, also described below. The finished bladder is strong and may be elastomeric and is capable of expanding within a damaged pipe to irregular surfaces therein. The outer layer is preferably 0.060 inches to 0.125 inches in thickness.

The device may be used preferably with, but is not limited to, pipes having interior diameters greater than 4 inches and less than 18 inches. The length of the heating device may be up to 12 feet. In one embodiment, a device intended for an 8 inch diameter pipe may have a diameter of approximately 5.5 inches and the deflated middle segment may be collapsed and folded to a diameter of approximately 4 inches.

Figure 6A:
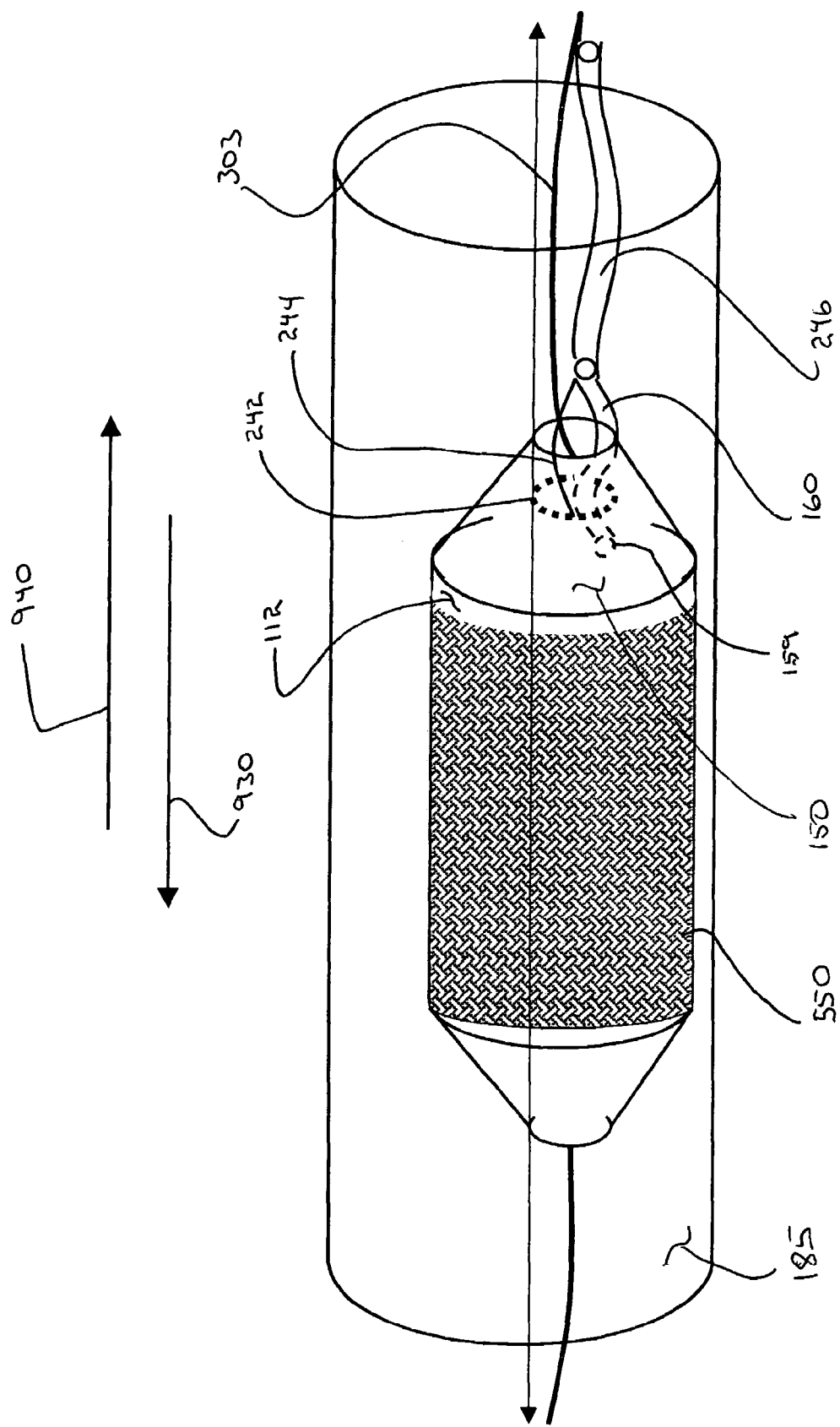
FIGS. 6A and 6B illustrate positioning of the bladder and repair material in conjunction with the pipe wall and inflation of the bladder.
Figure 6B:
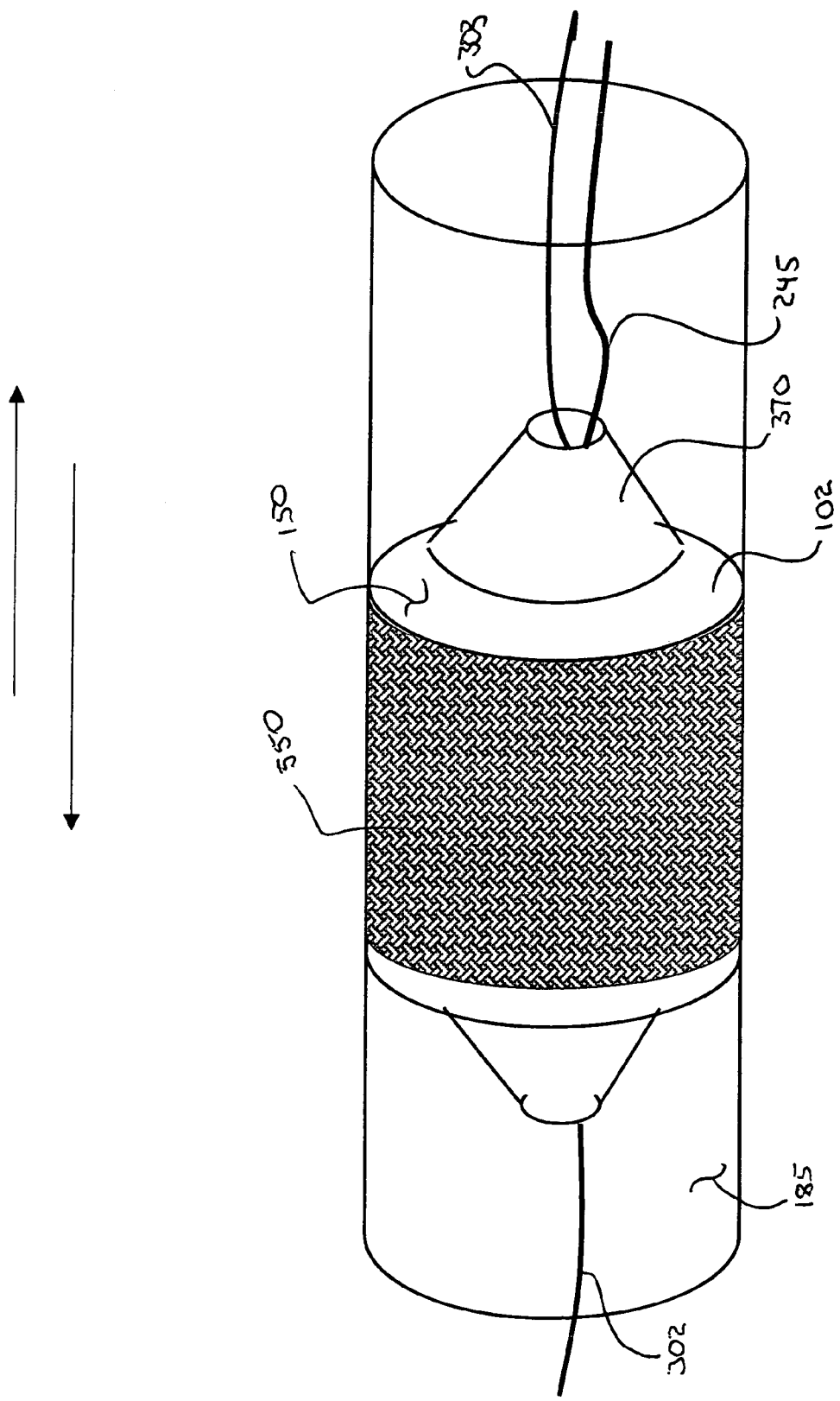
Figure 6C:
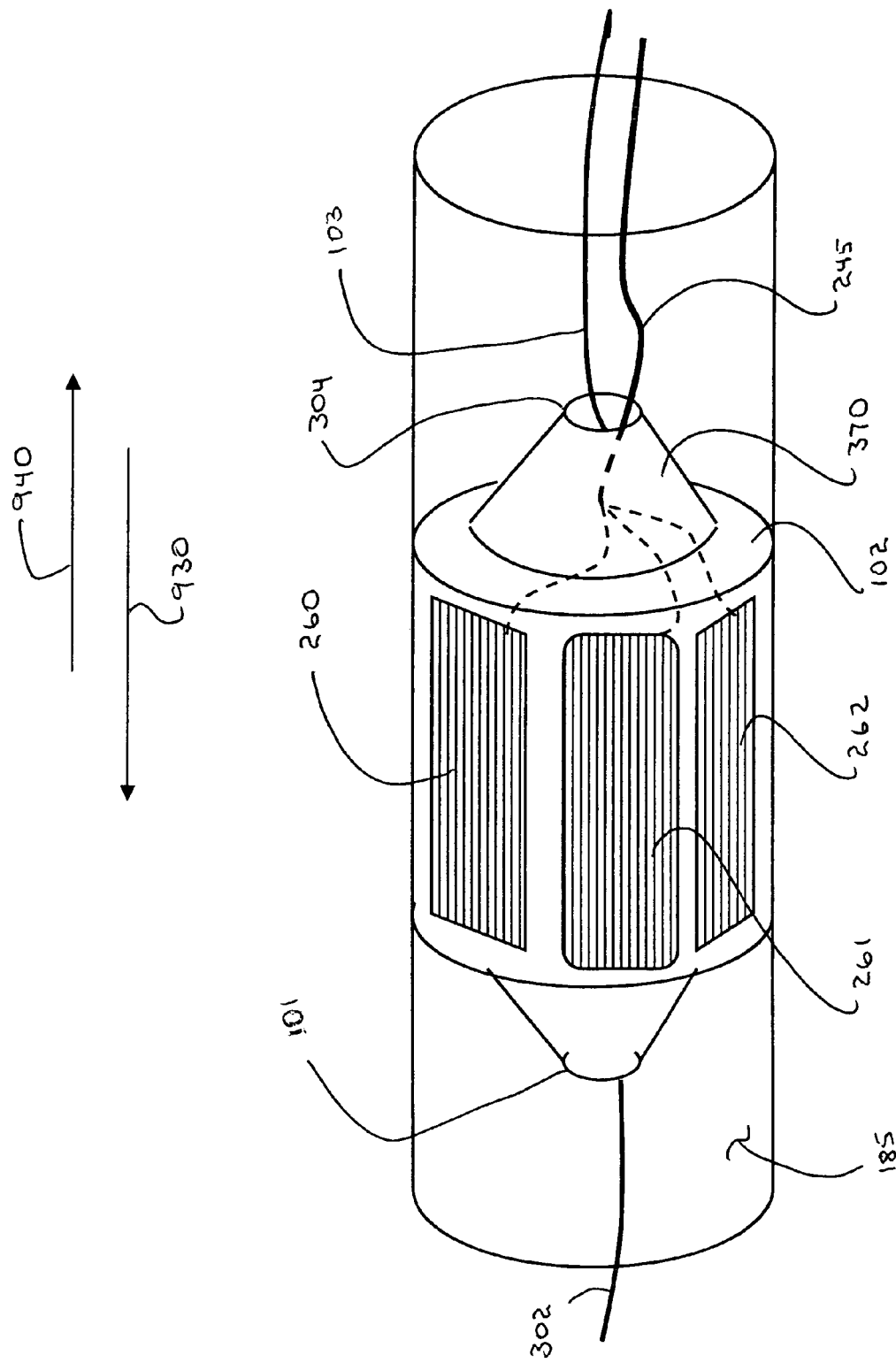
FIG. 6C illustrates an alternate embodiment of the invention showing multiple separately controllable heating elements arranged about the circumference of a bladder.

For larger diameter pipe, the bladder may comprise multiple heating zones arranged circumferentially on the outer bladder surface as illustrated in FIG. 6C. The zones 260, 261, 262 can be separately energized to sequentially heat portions of the pipe repair material thereby minimizing the power and material requirements.

The invention also includes embodiments wherein the bladder expansion is achieved by inflation of a substantially non elastic collapsed or folded deflated bladder. It will be appreciated that the bladder will be sized to the interior pipe diameter to optimize installation of the repair surface with a smooth surface and absence of gaps between the outer repair surface and inner pipe wall surface.

In another embodiment, it may be advantageous to have a portion of the inflation cylinder comprised of an elastomeric segment having a deflated diameter and a substantially inelastic segment having a same or different diameter.

FIG. 1A illustrates a perspective view of a cylindrical shaped repair device 102 having a first end 101 and a second end 103 such as the bladder subject of the invention. The object has a longitudinal axis 950 of orientation. Also illustrated is the radial 980 orientation or direction of the cylinder radius. The circumferential 970 orientation or direction is also illustrated.

Figure 1B:
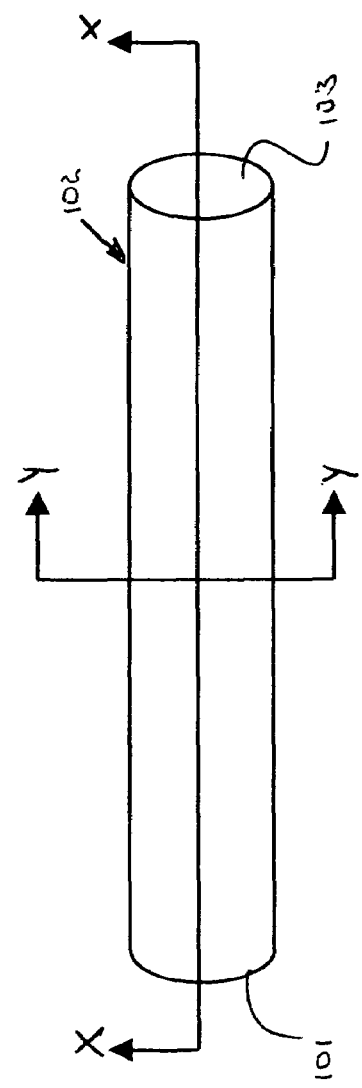
FIG. 1B illustrates a perspective view of the cylinder shaped bladder structure and the location of the cross sectional views depicted in FIGS. 2A and 2B.

FIG. 1B illustrates the same shaped object 102 with the location YY, XX of the cross sectional views that are depicted in FIGS. 2A and 2B.

FIG. 2A illustrates a cross sectional view along the axis XX of the cylindrical shaped bladder 102 of the subject invention having a first end 101 and a second end 103. The location of the interior inflation annulus 150 is also illustrated. The longitudinal 950 axis of orientation and radial 980 axis of orientation are also illustrated. A cross sectional view of the pre-inflated and un-pressurized bladder 110A is shown in FIG. 2A. FIG. 2B is a view of the expanded inflated bladder 110B. It will be appreciated that the bladder is fluid sealable, allowing it to be inflated with increased fluid pressure within the annulus 150. In the preferred embodiment, the expansion of the bladder, having an increased volume of the now fluid filled annulus, is in the radial 980 direction relative to longitudinal 950 expansion of the bladder. The diameter D of the inflated bladder is also larger with little or no change in the length L. Also illustrated are the fixed diameter ends 238, 239 which may facilitate the electrical contact between the electrical component (not shown) of the bladder and electrically conductive wires in communication with electrical controls or power supply (not shown).

Referencing FIGS. 1A, 1B, 2A and 2B, the bladder 102 is generally cylindrical or tubular, and has a longitudinal length L, a diameter D, and a circumference C. The bladder is constructed of a temperature tolerant material and the bladder may be formed from a plurality of flexible layers. The material may be a flexible, resilient substance such as silicone, fluorosilicone or fluoropolymer. The bladder contains electrically conductive fibers (a heating component that can be a separate layer) that when energized with an electric current, resistively heat the bladder and repair material. Electrical wires conduct the electrical energy from remotely stationed, controllable power supplies to the electrically conductive fibers. Heating temperatures produced range from 200° F. to 400° F. depending on the curing requirements of the resin matrix selected for use in the repair material. These temperatures can be achieved in as little as 10 minutes enabling an extremely short processing sequence.

Figure 2D:
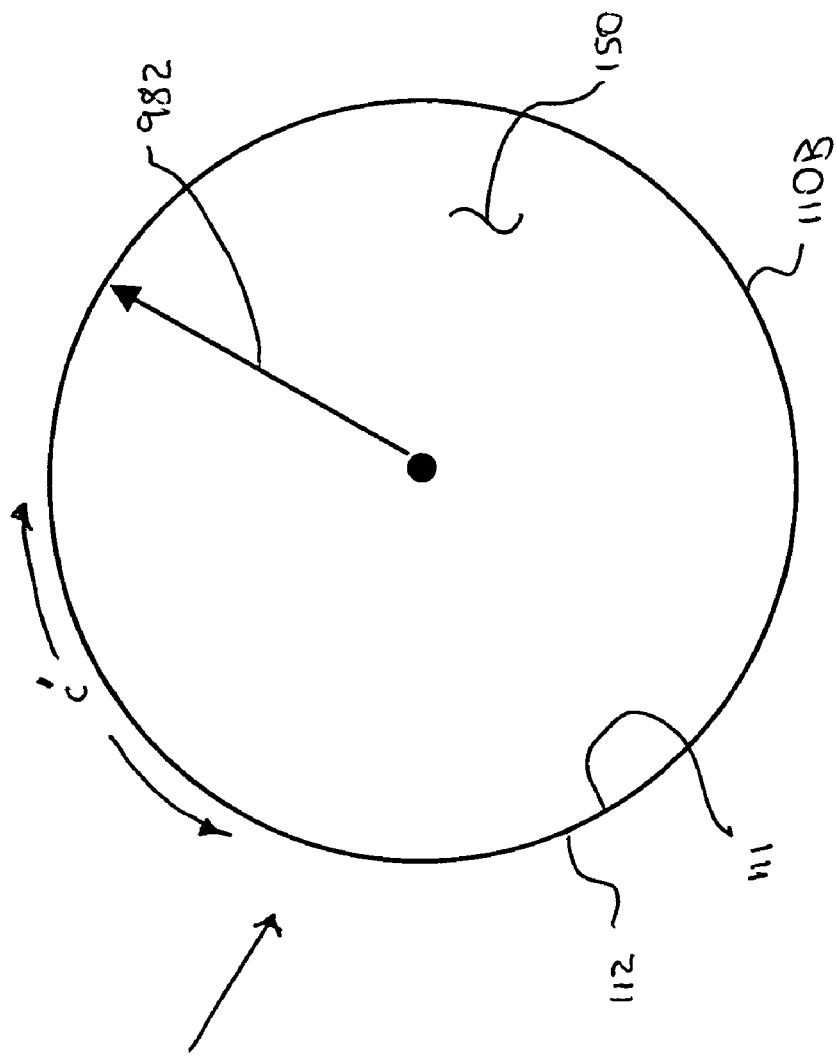
FIG. 2D illustrates a second cross sectional view and showing the radial and circumferential expansion of the bladder when inflated.
Figure 2C:
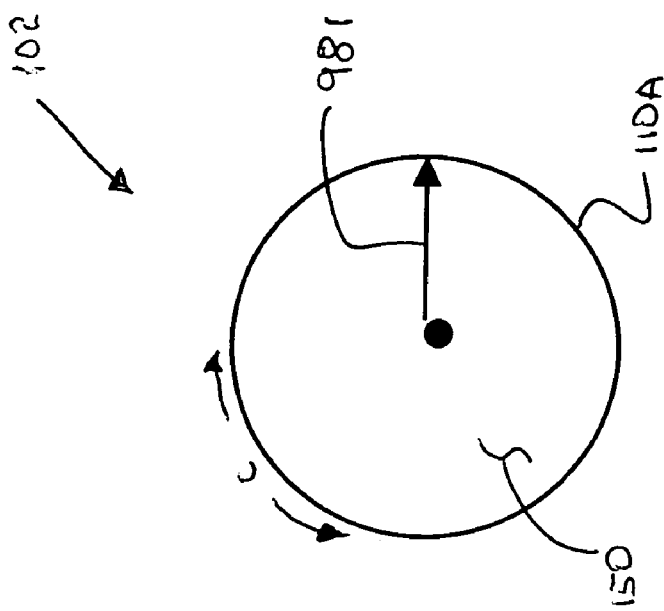
FIG. 2C illustrates a cross sectional view of the cylindrical shaped bladder structure across the longitudinal axis.

FIGS. 2C and 2D illustrate a cross sectional view of the bladder 102 along the axis YY. The location of the interior inflation annulus 150 is also illustrated. As illustrated in FIGS. 2C and 2D, the circumference C' of the inflated bladder 110B is also expanded from the circumference C of the un-inflated bladder 110A. The radius 981, 982 of the bladder expands when inflated 110A, 110B. The expansion of the radius 981 from the un-inflated bladder 110A to the increased radius 982 of the inflated bladder 110B is illustrated. The location of the interior 111 bladder surface and exterior 112 bladder surface is also illustrated. It will be appreciated that the repair material, to be installed on an interior pipe wall surface, will be carried on the outer or exterior 112 bladder surface prior to installation. At least a portion of the device will contain an electrically conductive heating component as will be described and illustrated in greater detail. It will be appreciated that the volume of the annulus 150 is larger when the bladder is inflated 110B than un-inflated 110A.

FIG. 3A illustrates an expanded cross sectional view of a wall segment of the bladder 102 containing an interior or inner surface 111 and exterior or outer surface 112 with the electrically conductive heating component 260 placed between the bladder surfaces. The heating component may be comprised of individual filaments (not shown) containing conductive fibers arranged in a selected fashion that will facilitate or be compatible with the variably expanding radius 980 and enlarging circumference of the bladder. The filaments may be of a woven, wound, knit or braid construction. The heating component layer 260 preferably is substantially unattached to either adjacent layers 120, 130 and the filaments may be moveable in relation to the other components of the bladder wall. In another embodiment, the bladder may be comprised of only the conductive heating component layer 260 and the outer elastic layer 130. In the illustrated embodiment, however, there is an inner layer covering the conductive heating component layer as a barrier to condensation, etc.

In yet another embodiment, the inner layer subcomponent may be the fluid impenetrable barrier of the bladder and the outer layer may be omitted. Alternatively, there may be an outer layer facilitating dispersion of the resistively generated heat of the heating component 260.

Figure 3B:
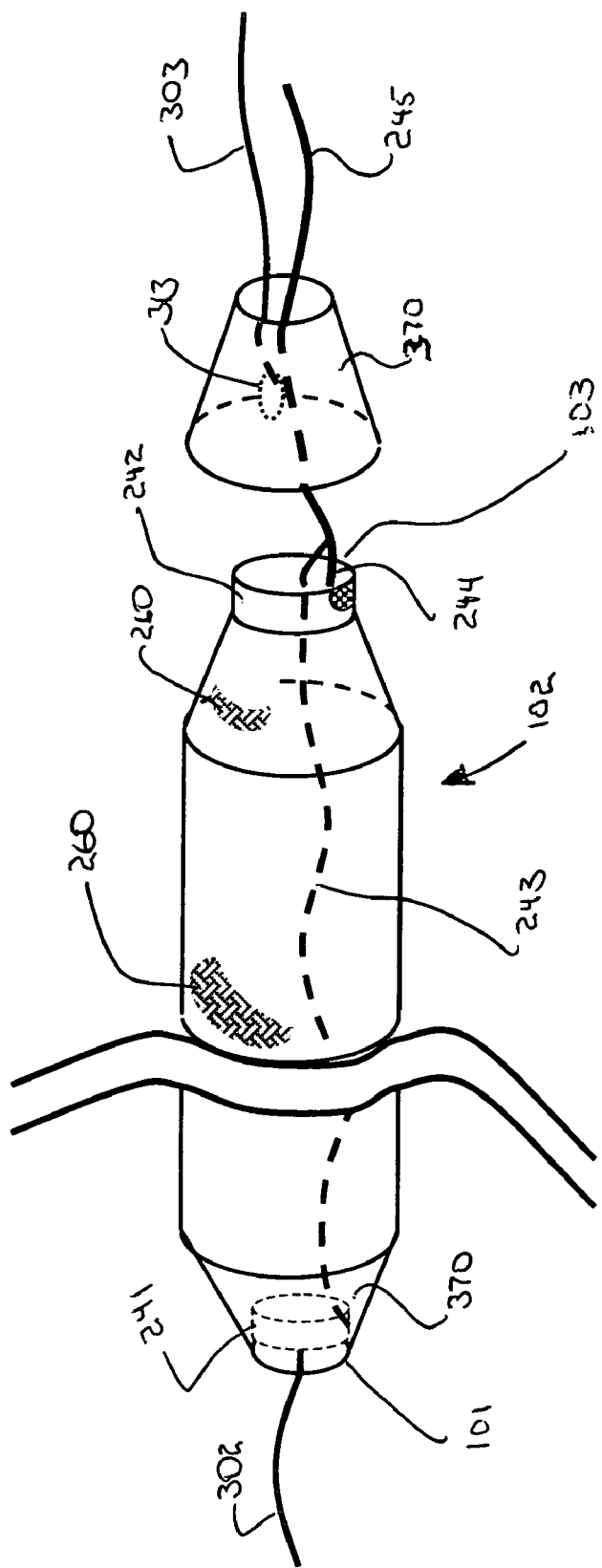
FIG. 3B illustrates the relationship of the end cone, with tether, and the fixed dimensioned end piece to the inflated middle segment portion of the conductive material.

FIG. 3B illustrates the major components of the inflation tool subject of the invention, comprising the bladder 102 with an electrically conductive layer (heating component) 260 attached to the conductive bus end components 241, 242, attached proximate to the bladder ends. The heating component layer 260, electrically conductive ends 241, 242 and electrically conductive wires (connective components) 243, 244 are combined into an electrical power cable 245 that exits from the protective cone end 370 (shown detached from the second bladder end for clarity of illustration). In one embodiment, the wire 243 from the bus 241 located at the first end may cross through the interior of the bladder. In one embodiment, the wire is affixed to the inner wall of the bladder with Teflon tape. Means are provided to seal the wire 243 through the second end of the bladder to prevent the escape of fluid pressure from the bladder annulus. Alternatively, the insulated wire may run along the outside of the fluid impenetrable inner bladder wall component. (Reference is made to FIG. 3A.)

Also illustrated is the tether 302 attached to the first end for pulling the device to the desired location of the pipe and the tether 303 attached to the second end and which may be used to remove the tool from the pipe after the repair material is installed. In another embodiment, the tool may be pushed into the pipe by an apparatus or subcomponent. In one embodiment, this pushing component ("push rod") may contain the power cable and fluid conveying hose(s).

Figure 3C:
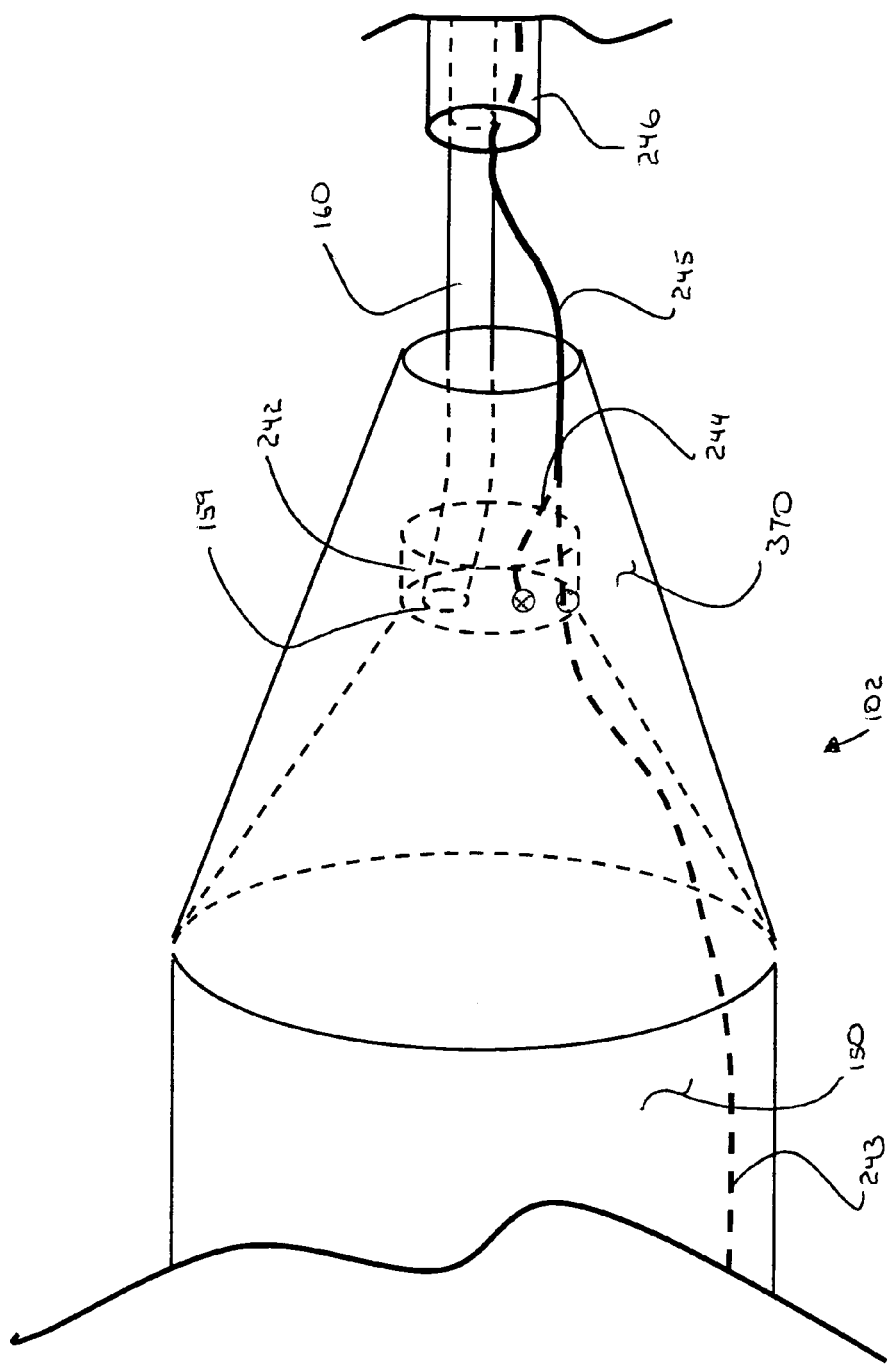
FIG. 3C is a detailed illustration of the second bladder end and end cone, along with the fluid hose and electrical connector and wires.

FIG. 3C illustrates a detailed view of the bladder second end comprising the maneuvering and protective cone end 370, electrically conductive wire 243 from the first end conductive bus, the fixed diameter second end conductive bus 242 in electrical communication with the second wire 244 and combined with the first wire 243 to form the power cable 245 in electrical communication with an electrical power supply or control (not shown). Also illustrated are the inflation annulus 150, access port 159 and fluid communication hose 160 which will be in communication with a fluid control or fluid reservoir, such as an air compressor (not shown). It will be appreciated that the annulus can be positively pressurized with fluid and that it may also be subjected to negative pressure or vacuum through the fluid hose or by other means that will be readily understood by persons skilled in the art. It will be appreciated that the end of the device will preferably also comprise a tether (not shown) that will allow the device to be pulled from the interior of a pipe (not shown). It will be appreciated that use of the device may be enhanced by combining the power cable 245 and the fluid communication hose 160 into a single water protected line 246.

Referencing FIGS. 3B and 3C, in one embodiment, each end 101 103 of the bladder 102 is contained within a cone shaped subcomponent (cone end) 370. At the first end 101, the cone, which may be made of a variety of material, including but not limited to metal, resin polymers or carbon fiber matrix, contains a tether attachment mechanism. It may also contain the electrical connection components 241, 243 for the end components (bus) and heating component. The shape of the cone end also facilitates movement of the device through the pipe interior for placement at the desired location. It will of course be appreciated that the cone has an end (base end) with a larger diameter (base diameter) than the narrow or small or diameter end. The narrow diameter end may contain an aperture through which a fluid conveying hose, power cable and tether component may pass. In one embodiment, the base end fits over an end of the bladder component.

The second end 103 of the bladder component also incorporates a second cone end 370, and again facilitating the removal of the device 102 from the pipe (not shown) after completion of installation. This cone end can likewise contain a tether 303 connector. It may also contain the electrical connecting components 242, 244 for the second end of the conductive material. This end also contains the access port 159 for the inflation annulus 150 and hose 160. The two insulated electrical wires 243, 244, one connected to each of the two conductive end components (the first and a second end), may be placed together in a power cable 245, along with the fluid conveying tube or hose 160 (not shown in FIG. 3B) and, if chosen, a tether 303 connected to the subcomponent of the second end, to form a single cable device leading to a pulling device or controller and ultimately in communication with a fluid reservoir or compressor and an electrical power supply.

Referencing FIG. 3C, in one embodiment, the electrical connections are water protected. The bladder 150 may be detachable from the fluid hose 160, electrical connector cable 245 and tether 303 to facilitate replacement or to switch to a bladder of different length and/or diameter. The bladder diameter may be selected for compatibility with the inside diameter of the pipe. In one embodiment, each electrical connection component or bus (241, 242 in FIG. 3B) of the conductive heating component within the device is located in fixed position relative to the expansion of the bladder 102. These subcomponents are located proximate and may be removeably attached to the first end piece 101 and the second end piece 103 of the device.

The heatable inflatable portion of the device may consist of an inner layer 120 of one elastomeric material that is substantially fluid impermeable, a layer of electrically conductive material 260 and a second outer layer of elastomeric material 130. The second outer surface can be used to detachably hold a resin impregnated repair material.

Figure 4:
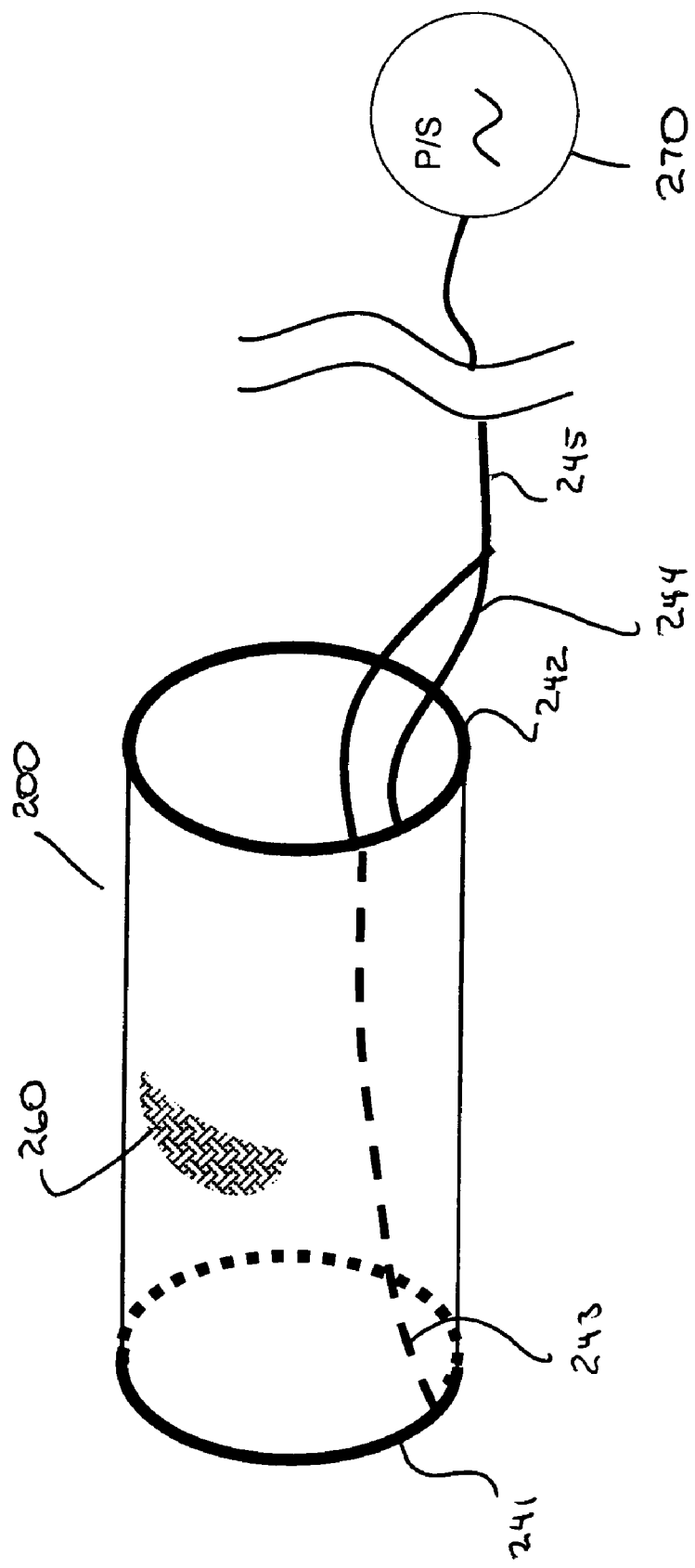
FIG. 4 illustrates an embodiment of the electrically conductive heating element and circuit contained within the bladder.

FIG. 4 illustrates a perspective view of the electrically conductive heating component 200, comprising a cylindrical shaped component of electrically conductive filaments or fibers 260 that may comprise carbon or graphite fibers or filaments ("carbon fibers"). The heating component has a first end and second end with the fibers attached to a conductive component or bus 241, 242 that is in turn attached to a fixed dimensioned end piece (not shown). Attached to each bus is an electrically conductive wire 243, 244 also termed "connective component" that can be combined into a power cable 245. The cable can be connected to an electrical power source 270, and thereby forming an electric circuit. Each bus may be attached to an end of the bladder. (See items 238 and 239 in FIGS. 2A and 2B.) For purpose of simplified illustration, the radial expansion of the heating component is not shown. However, it will be appreciated that the component expands in conformance with the bladder as shown in FIGS. 2A and 2B. In one embodiment, the fibers comprising the heating component 200 may be in a knit or braided configuration.

Figure 5:
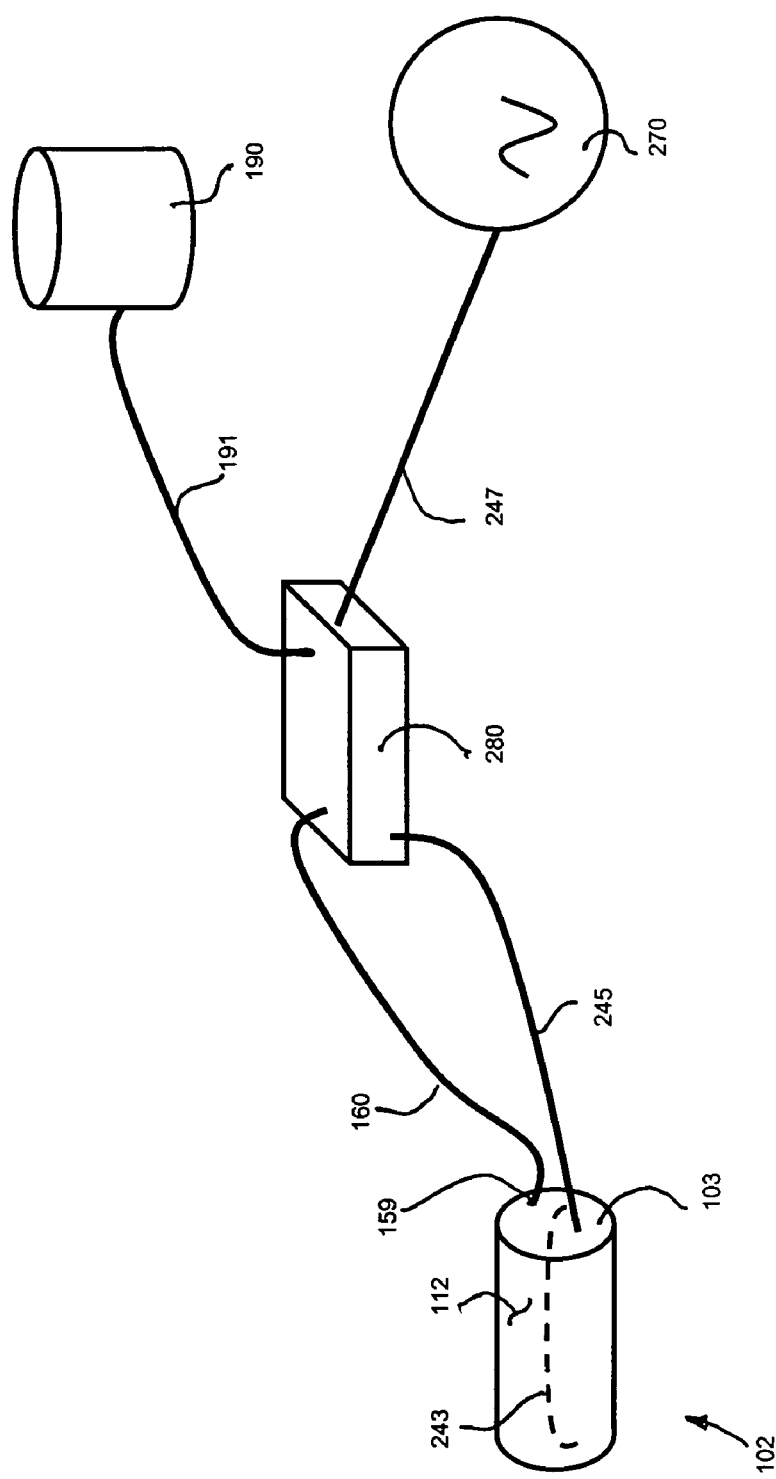
FIG. 5 illustrates an embodiment of the invention incorporating the device, the attaching components, power controls, fluid compressor and electrical power supply.

FIG. 5 illustrates the bladder 102 component in conjunction with an electrical cable 245 in communication with a power controller 280 also in electrical communication 247 with a power source 270. Also illustrated is the fluid hose 160 in communication with the bladder and controller and an second fluid hose 191 between the controller and fluid supply or reservoir 190 (which may be an air compressor). The illustrated cable 245 contains the electrical circuit wires 243, 244 illustrated in FIG. 4. The inflatable bladder system illustrated also includes a fluid communication hose 160 connected to the second bladder end 103 and pressure controller 280 via the bladder port 159. Although the connector may be a closeable device or valve, it will be appreciated that the annulus 150, and hose 160, connected to a pressure controller 280 or compressor 190, may form a closed system that can simultaneously be subjected to equal fluid pressure when the bladder is inflated. Also illustrated in FIG. 5 is the outer bladder wall surface 112. As mentioned above, the fluid communication hose 160 and electrical cable 245 may be combined in a single protected line for ease of handling.

FIG. 6A illustrates the bladder within the interior of a pipe 185 prior to inflation. The bladder is located proximate to the pipe defect (not shown) subject of repair. The repair liner 550 is covering a portion of the outer surface 112 of the bladder. It will be appreciated that prior to inflation or full inflation, the outer radius of the bladder is smaller than the interior radius of the pipe, thus facilitating the movement of the bladder and liner through the pipe to the selected area illustrated by the vector arrows 930, 940. Also illustrated are the fluid hose 160 and the detachable bladder port 159 to the bladder annulus 150. These subcomponents form part of the closeable system for fluid pressurization. The hose 160 is combined with the electrical line 244 from the bus 242 to form the single cable 246. Not shown is the second leg of the electrical circuit. Reference is made, however, to FIG. 4.

FIG. 6B illustrates the bladder 102 after inflation. The fluid pressure expands the volume of the annulus 150, preferably in a substantially radial direction. The material of the repair material 550 supports a thermally responsive resin. The repair material may be a fiber reinforced material such as a woven or knit liner. In some embodiments, the radial expansion of the repair material, with the resulting increase is circumference may be off set, in part, by a decrease in the length of the material in the longitudinal axis of orientation. It will be appreciated that the repair material can, alternately, be a lay-up of woven fabric or other construction. The repair material is also not required to be a fiber reinforced material. It will be also appreciated that the relative size of the device to the pipe inside diameter and the radial expansion of the bladder and repair material is exaggerated. When inflated, the repair material is pressed to the inside pipe wall.

It will be appreciated that in one embodiment, the heating component is located between the inner and exterior surfaces in at least a portion of the bladder. The heating element may be located around the circumference of the bladder.

The invention may comprise a plurality of separately energized heating circuits (heating components) as illustrated in FIG. 6C. It will be appreciated that this can be used for the repair of large diameter pipes or alternately employed to produce varying levels of energy specific to the environmental requirements within these circuits. Each circuit can be separately controlled or energized. The invention is not limited to three circuits. In one embodiment, differing arc segments of the circumference may contain separate circuits. In another embodiment, the separate heating component circuits are disposed along the longitudinal axis of the device.

The portion of the bladder length containing the heating component may also include the area of the bladder surface on which the repair liner is held or carried prior to installation. Tethers may be attached and used to pull the bladder into and from the pipe.

In another embodiment of the invention, the heatable and inflatable bladder tool can be inserted into a pipe utilizing a push rod component. This may be effective when only one access point is available. The rod component may be stiff or fabricated with sufficient flexibility to allow it to conform to bends or angles within the pipe. The push rod component may also contain the electrically conductive wires forming the electrical circuit for resistive heating. It may also include the fluid communication hose.

FIGS. 7A through 7E illustrate the installation method taught by the invention. It will be again appreciated that the size relationship between the pipe and the device is exaggerated for illustration. The cone ends are not shown. In one embodiment, the deployment process for installing the bladder 102 and repair material 550 to the desired location 549 of the pipe 185 for repair incorporates use of a tether 302 attached to the un-inflated device proximate to the first end 101. The second end of the tether may be attached to a winch or pulley device (not shown) that facilitates pulling the bladder and repair material into the pipe as shown by a vector arrow 930. The second end 103 of the bladder may be connected to a separate tether 303 used for removal or retraction of the bladder after installation of the repair material. The device is also connected by electrically conductive wires or cables and fluid conveying hose to a power controller or fluid compressor and electrical power supply (not shown) to enable the inflation and heating of the bladder when placed at the selected location. It will be appreciated that the device may be used in conjunction with video cameras to facilitate accurate placement.

In FIG. 7B, the un-inflated bladder 102 is pulled to the desired location 549 within the pipe 185. FIG. 7C illustrates the bladder 102 inflated, pressing the repair material 550 against the interior wall surface of the pipe 185. When the bladder and repair material are deployed to a desired distance within the pipe, the bladder can be inflated using fluid conveyed through a hose (not shown) into the bladder annulus. The fluid can be a liquid or compressed gas. In one embodiment, the hose is connected to an air compressor and the pressure of the bladder is monitored by separate controls (not shown). When the desired pressure is achieved, indicating that the bladder has inflated sufficiently to press the repair material to the inner pipe wall, the electrically conductive material (not shown) within the bladder can be energized with electric current. This will be accomplished by the electrically conductive cable extending from the second end of the device back through the pipe (along with the fluid hose) to a controller or power supply (not shown). The device may include thermocouples within the conductive material to allow monitoring of the temperature, thereby, for example, facilitating the effective cure of a thermal setting resin impregnating the repair material. Alternatively, a consumable thermocouple, detachably connected by a wire to the bladder may be contained in the actual repair material. In another embodiment, a consumable, temperature probe can be inserted into the host pipe to provide feedback to the power controls (not shown). In yet another embodiment, an SCR component within the separate control device may be used to measure the temperature of the heating component by monitoring the change in electrical resistance.

Figure 7E:
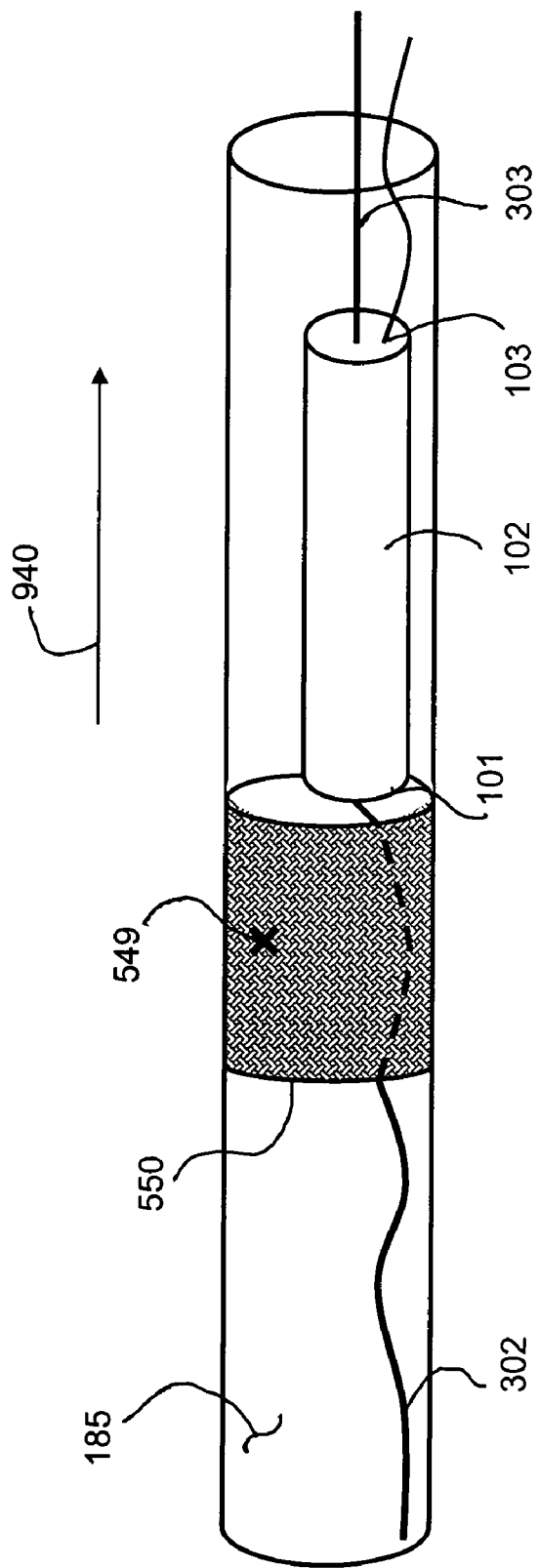

The heating component is energized, heating the repair material. The repair material may contain a thermal setting material the cure of which may be initiated or facilitated by the application of heat. The repair material may alternatively contain a thermal plastic resin. The application of heat will allow the repair material to be plasticized and, in combination with the fluid pressure within the bladder, is molded to the interior pipe wall surface. The heating element can then be de-energized and the thermal plastic repair material allowed to cool, thereby solidifying the repair material to the interior shape of the pipe. As part of the removal step after installation of the repair material, FIG. 7D, of the tool 102, the fluid pressure within the bladder is released and the bladder can then be deflated, reducing the size and separating from the repair material now installed on the pipe wall surface. FIG. 7E illustrates the deflated bladder 102, now having a reduced radius or diameter, being pulled from the pipe, as shown by the vector arrow 940, by a tether 303 attached to the second end 103 of the bladder. This deflation of the bladder can be facilitated by creating a negative pressure within the annulus or inflation chamber of the bladder by use of a vacuum pump.

When the desired temperatures have been achieved and cure cycle complete, the apparatus can be removed from the pipeline (and loaded again with repair material for reuse). With the ability to quickly produce and control heat, multiple repair installations are completed in a short time frame.

The removal steps include first de-energizing the electrical circuit containing the conductive fibers in the bladder. Next, the fluid pressurization can be stopped and, optionally, can be introduced to vacuum. In one embodiment, a venturi type vacuum pump which produces vacuum from a pressurized air supply can be utilized. Electro-pneumatic solenoid valves located with the separate control component can be used to switch the supply of pressurized fluid from delivery to the bladder annulus and be redirected to a vacuum pump. This application of vacuum quickly and completely evacuates all fluid from within the bladder and causes the bladder to collapse on itself, releasing contact from the completed repair material and the interior surfaces of the pipe.

Figure 8:
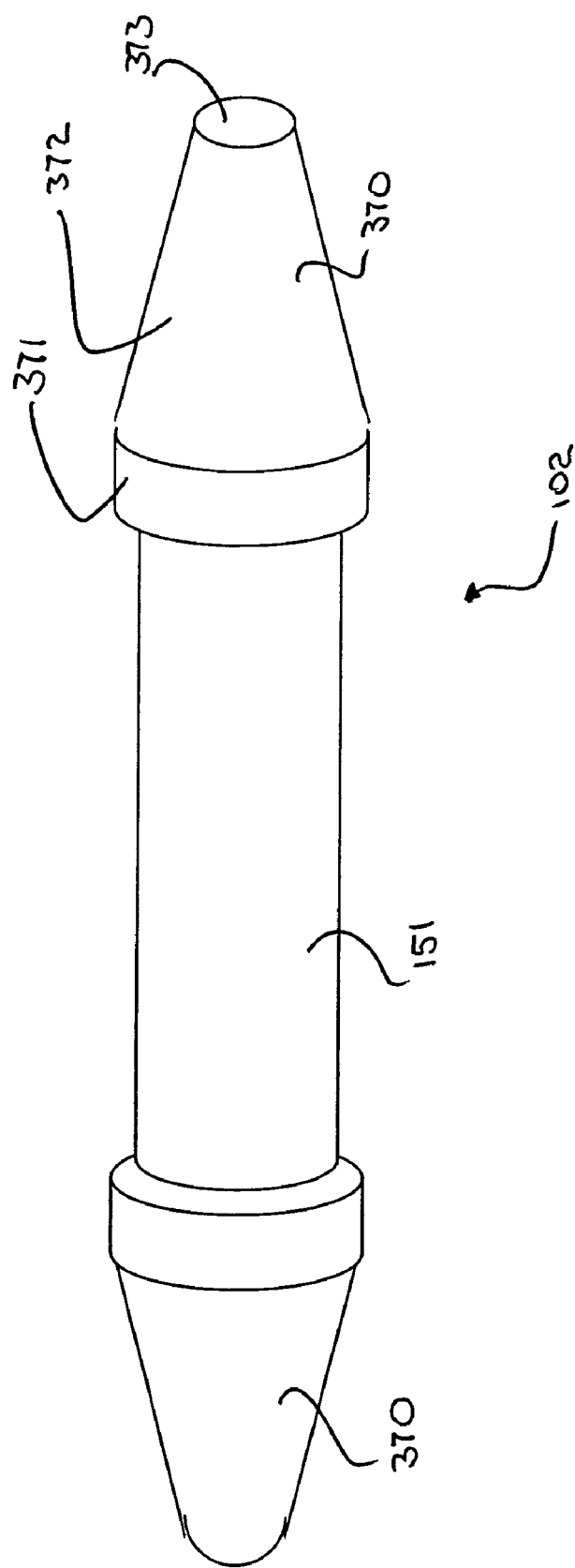
FIG. 8 illustrates the middle portion of the device in relation to the fixed dimensioned end cones prior to inflation.
Figure 9:
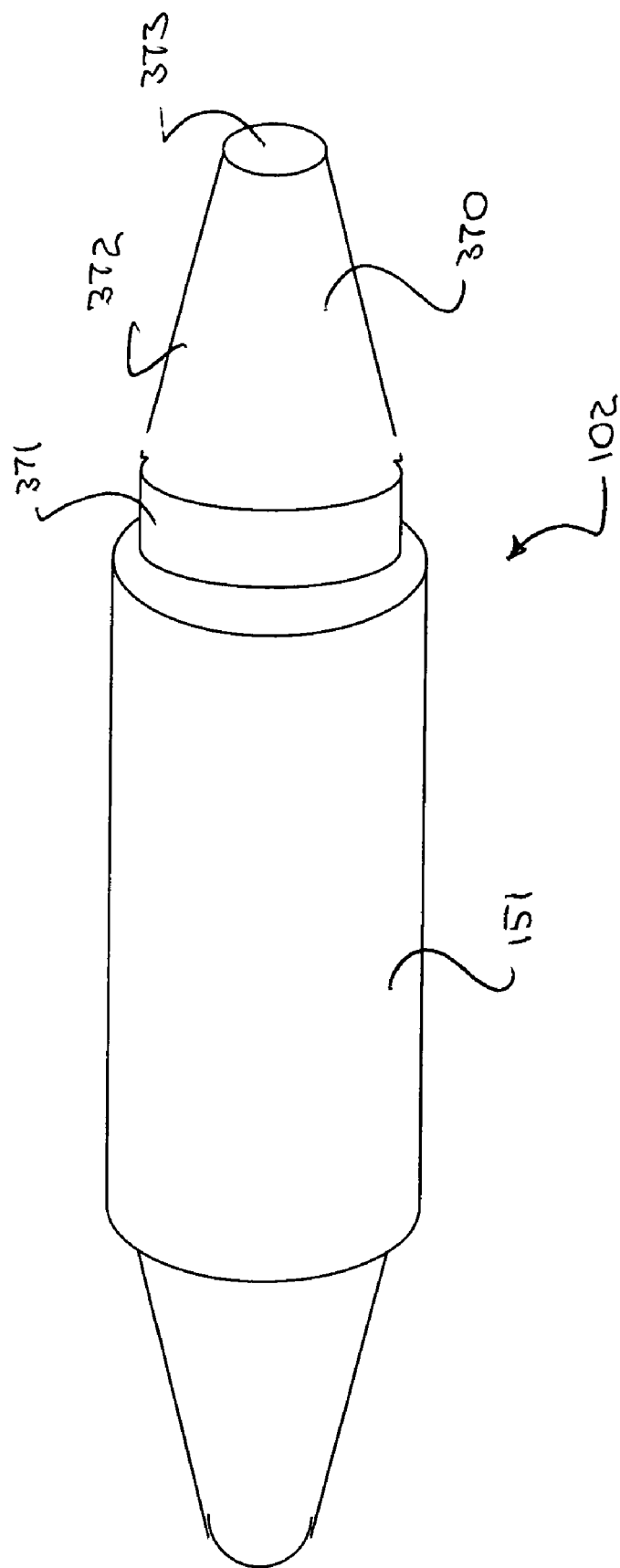
FIG. 9 illustrates the inflated middle portion of the device and the fixed dimensioned end cones.
Figure 12:
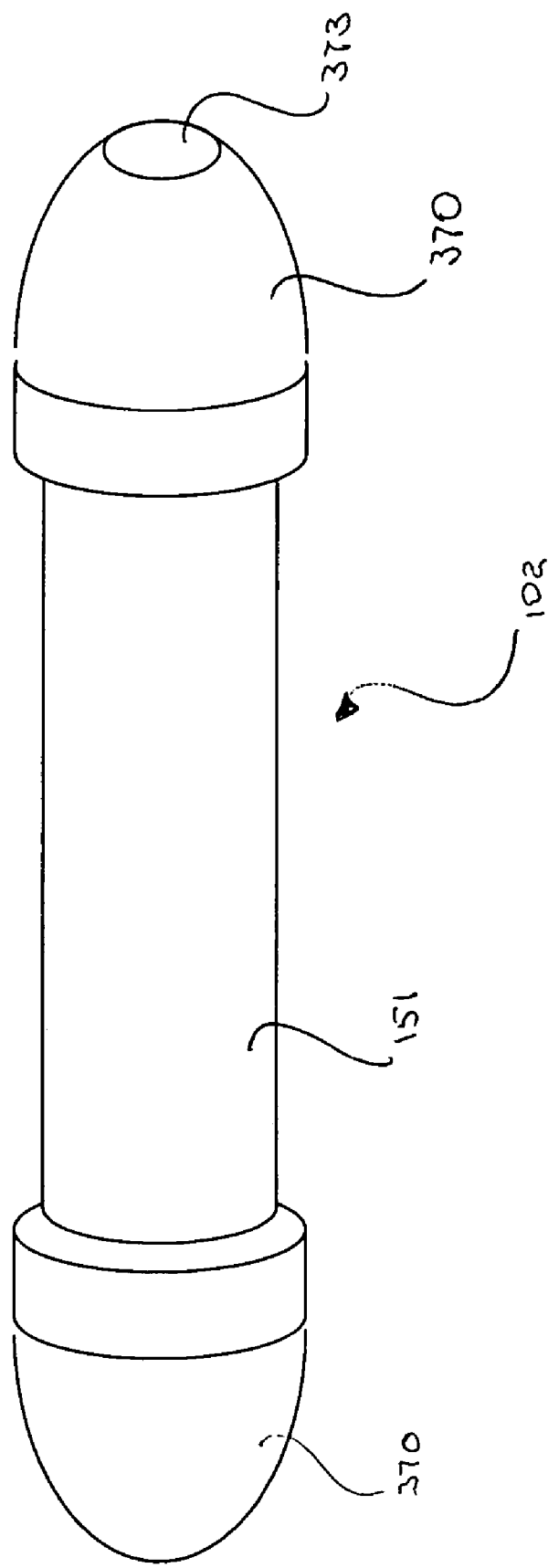
FIG. 12 illustrates an embodiment wherein the protective end cones are substantially hemispherical.

FIG. 8 illustrates of the relationship between the base diameter of the end cones 370 of one embodiment and the middle section 151 when deflated. FIG. 9 illustrates the relationship when the device 102 is inflated, showing the diameter of the middle section being greater that the cone end base diameter. Also illustrated is the aperture 373 of the cone end through which the power cable and fluid hose (not shown) may emerge from the device. FIG. 12 illustrates an embodiment of the end cones 370 have a hemispherical shape.

Figure 10:
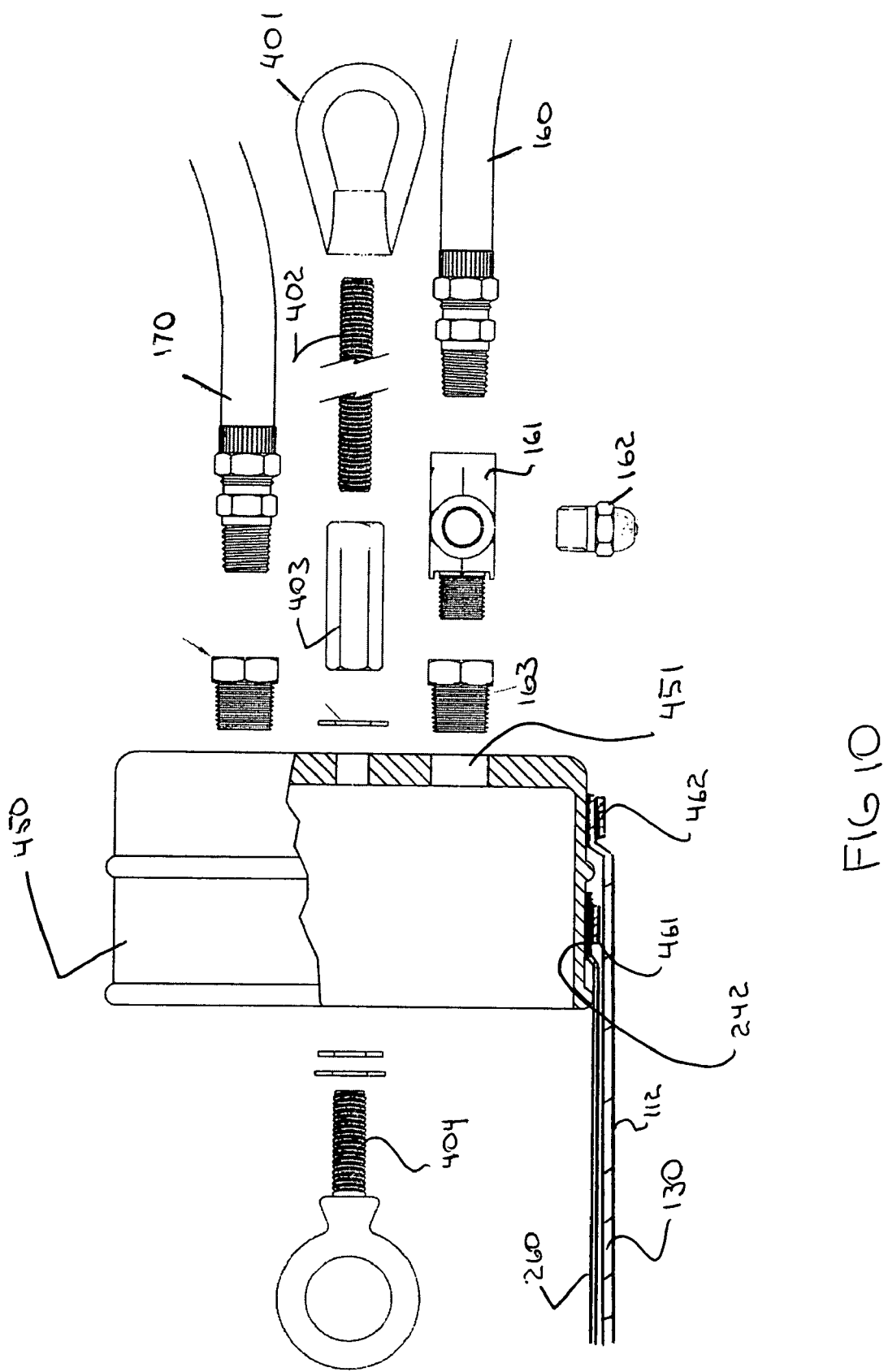
FIG. 10 illustrates the connective components of one embodiment of the device, including the heating element and outer layer of the inflation device. Also illustrated are two fluid inflation hoses and the cone end attachment devices.
Figure 11:
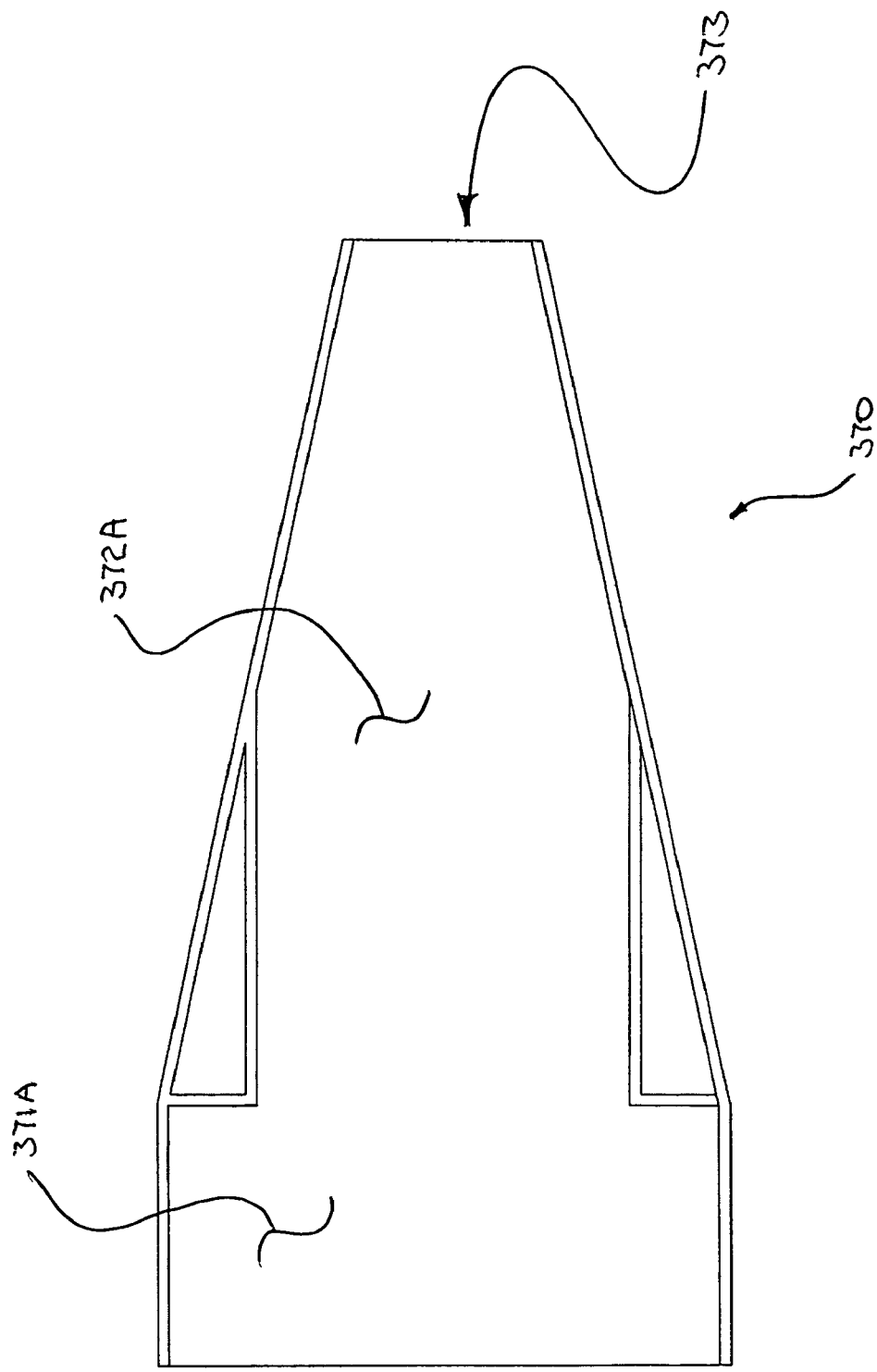
FIG. 11 is a cross sectional view of a cone end, illustrating the aperture and the inner annulus in which the end of the inflation component may be held.

FIG. 10 illustrates the subcomponents of one embodiment of the device. A cross sectional view of the device cone end is illustrated in FIG. 11. It will be appreciated that the subcomponents illustrated in FIG. 10 fit within the annulus 371A, 372A of a cone end illustrated in FIG. 11. Illustrated in FIG. 10 is the fixed diameter end piece 450 containing two fluid access ports 451. The end piece may fit with the annulus 371A of the cone. The electrical connector component (not shown) may, in one embodiment, pass through an access port and fluid hose connection and emerge through the "T" 161, 162 connection. Illustrated also is the heating component 260 attached to the conductive end or bus 242 and held to the end piece by a clamp 461. The outer layer of the inflation component 130 is also held to the end piece by a clamp 462. The fluid hoses 160, 170 and the power cable (not shown) pass through the annulus 372A of the cone 370 and through the aperture 373 illustrated in FIG. 11. The fluid hose is connected to the access port utilizing the subcomponents 161, 162, 163.

The end piece and the cone are held together by a combination of eye bolts and threaded connectors 401, 402, 403, 404. The eye bolt 401 may serve as attachments for a tether component. It will be appreciated that other configurations of subcomponents are possible and will be suggested to persons skilled in the technology.

The invention also includes connective means to convey electrical power through the inflated bladder. Various means for such connection are known to persons skilled in the technology. It will be appreciated that the conductive material is not required in all parts of the bladder, but will be located proximate to the portion carrying the repair material. As previously mentioned, the heating component of the device supplies resistive heat that can be used for activation of the resin curing reaction. Also, the heating component may be placed as an additional "outer layer" to the bladder, in contrast to being an "inner layer" radially distant from the outer surface. Placement in an outer layer configuration may enhance heating and power efficiency. It may also allow the part to be separately maintained or replaced from the expandable bladder component.

The control device can include pneumatic controls, including air supply hook-up, self-relieving regulator, both mounted and remote pressure sensing, air logic switching and safety pop-off valve with an air release. Twist-lock power supply hook-up assembled in accordance with NEC specifications and electrical circuits having GFI protection may also be utilized. Other embodiments can include 110/220 volt input power supply with thermocouple feed-back and digital control. Low voltage, direct current output can also be utilized.

An embodiment of the invention includes the ability to monitor the temperature of the bladder wall. This monitoring can, of course, be combined with varying the power level to accurately maintain a desired heat level at differing sections of the bladder in conjunction to the repair material and location within the pipe. One method for heat monitoring utilizes the resistive heating elements in combination with a semiconductor device (SCR). The SCR controls current flow from an electrical power source to the resistive heating elements using switching techniques. When the control signal is off, the SCR performs as an open switch and prevents the current from flowing from the SCR to the resistive heating elements. At this time, the impedance of the heating elements can be measured to identify the level of heat production. When the control signal is on, the SCR acts as a unidirectional switch and current can flow to the resistive heating elements in one direction. SCR power controls use three different switching modes; on-off, phase angle and zero-fired. On-off controls replicate the operation of an electromechanical contactor or relay. Phase angle control replicates the operation of variable transformers, providing variable control of the voltage impressed on the load. Because SCRs can be switched on at any time during each half cycle of the AC waveform, the voltage to the resistive heating elements is infinitely variable from zero to 100%. Phase angle switching will be suitable and desired for control of the heating process disclosed in this application.

The impedance measurement referred to above will be the means for in-process temperature monitoring. A measuring system will be employed to provide a feedback signal to the SCR power supply. The conductive fibers present in the resistive heating elements have a dual purpose. During the "on" cycle of the SCR, these fibers will provide the heat necessary for processing. During the "off" cycle of the SCR, these fibers will be utilized as sensing electrodes to provide information back to the impedance measuring system, and in turn, to the SCR.

A direct correlation exists between the conductivity of the heating elements and temperature that enables an accurate depiction of heat generation to be determined continuously throughout the repair process. In this technique, data from the monitoring will be used as input for Statistical Process Control (SPC). Software can be developed to identify the time at which critical points related to a specific event occur. This in turn will provide feedback to a controller that will send a proportional signal to the SCR.

While specific embodiments have been illustrated and described, numerous modifications are possible without departing from the spirit of the invention.

What is claimed is:

1. An in situ pipe repair device for installation of a pipe repair material onto the interior pipe surface comprising:
   a. a cylinder component comprising an elastomer and having a deflated diameter and an inside surface and an outside surface wherein the outside surface comprises a middle segment to hold repair material, and the cylinder component further comprises closeable end components sealably attached to the cylinder component creating an inflatable annulus;
   b. a heating component substantially disposed on or within the cylinder component length and circumference and comprising knitted carbon fibers or knitted carbon hybrid fibers;
   c. at least one conductive component attached to the heating component that when the conductive component is connected to a power source forms at least one electrical circuit with the heating component;
   d. one or more access ports located within at least one end component that can convey a fluid into the inflatable annulus; and
   e. a cone end attachable to an end component.

2. The device of claim 1 further comprising a push rod.

3. The device of claim 1 wherein the elastomer comprises a silicone.

4. The device of claim 1 further comprising the end components having diameters dimensioned to fit within an interior diameter of the cone ends.

5. An in situ pipe repair placement, transport and installation device comprising:
   a. a cylindrically shaped inflation component comprising fluid impermeable first and second end pieces each having a fixed diameter and wherein at least one end piece has an access port, a cylinder component that is fluid impermeable and comprising an elastomer and further comprising a first end and second end that are fluid sealably attachable to the first end piece and the second end piece and wherein the combined cylinder component, first end piece and second end piece form an inflatable annulus;
   b. a cylindrical shaped heating component with an expandable diameter comprising a knit of carbon fiber or carbon hybrid fiber and further comprising a first end and a second end and dimensioned to fit proximate to a surface of the cylinder component;
   c. a first and second conductive end component attachable to each end of the heating component and connectible to an electric power source; and
   d. a first and second cone attachable to the first and second end pieces and comprising at least one aperture for an electrical cable and a fluid hose and wherein a base diameter of each cone is at least as large as the diameter of the first and second end pieces.

6. The device of claim 5 wherein the cylinder component comprises Teflon.

7. The device of claim 5 wherein the cylinder component comprises fibers.

8. The device of claim 5 wherein the heating component is placed between a first layer of the cylinder and a second layer of the cylinder component.

9. The device of claim 5 further comprising a fluid hose attachable to the fluid access port.

10. The device of claim 5 further comprising a power cable that can be placed in electric communication with the conductive end components.

11. The device of claim 5 further comprising a tether attachment component.

12. The device of claim 5 further comprising a push rod.

13. An interior surface pipe repair device comprising:
a. an electrically resistive heatable bladder component comprised of knitted carbon fibers or knitted carbon hybrid fibers and located proximate to the flexible outer elastomeric wall of the device, said device having an inflatable annulus and comprising the elastomeric wall, the heatable bladder and cone ends wherein the cone ends and bladder are dimensioned to fit within a pipe interior, and a middle segment of the bladder between the cone ends;
b. fluid conveying components connectable to the inflatable annulus; and
c. electrical power connector components connectable to heating component and a power source.

14. The device of claim 13 further comprising a push rod for moving the device within the interior of a pipe.

15. An interior surface pipe repair material placement, transport and installation method of insitu pipe repair comprising:
a. placing a repair material containing heat responsive resin onto a middle segment of an electrically heatable and fluid inflatable device comprised of knitted carbon or carbon hybrid fibers, the middle segment of the heatable and inflatable device being between a first cone end and a second cone end;
b. attaching a fluid conveying component to an inflatable annulus of the device;
c. attaching an electrical power component to a resistive heating component of the device;
d. inserting the device and repair material into an interior of the pipe to be repaired;
e. maneuvering the device within the pipe to a repair location;
f. inflating the annulus of the device sufficiently to press the repair material to the interior surface of the pipe;
g. energizing the resistive heating component sufficiently to heat the heat responsive resin of the repair material;
h. de-energizing the resistive heating component after the repair material has been sufficiently heated;
i. deflating the bladder; and
j. removing the device from the pipe.

16. The method of claim 15 further comprising maneuvering the device within the pipe using a push rod.

17. The method of claim 15 further comprising maneuvering the device within the pipe using at least one tether.

* * * * *